(12) United States Patent
Bemanian et al.

(10) Patent No.: US 11,645,178 B2
(45) Date of Patent: May 9, 2023

(54) FAIL-SAFE SEMI-AUTONOMOUS OR AUTONOMOUS VEHICLE PROCESSOR ARRAY REDUNDANCY WHICH PERMITS AN AGENT TO PERFORM A FUNCTION BASED ON COMPARING VALID OUTPUT FROM SETS OF REDUNDANT PROCESSORS

(71) Applicant: MIPS Tech, LLC, Campbell, CA (US)

(72) Inventors: Majid Bemanian, Pleasanton, CA (US);
Lawrence H Hudepohl, Saratoga, CA (US)

(73) Assignee: MIPS Tech, LLC, San Jose, CA (US)

( * ) Notice: Subject to any disclaimer, the term of this patent is extended or adjusted under 35 U.S.C. 154(b) by 89 days.

(21) Appl. No.: 16/522,429

(22) Filed: Jul. 25, 2019

(65) Prior Publication Data
US 2020/0034262 A1    Jan. 30, 2020

Related U.S. Application Data

(60) Provisional application No. 62/703,899, filed on Jul. 27, 2018, provisional application No. 62/776,032, (Continued)

(51) Int. Cl.
*G06F 11/18* (2006.01)
*G06F 11/273* (2006.01)
*G06F 11/22* (2006.01)

(52) U.S. Cl.
CPC ........ *G06F 11/273* (2013.01); *G06F 11/2242* (2013.01)

(58) Field of Classification Search
CPC ............. G06F 11/1608; G06F 11/1625; G06F 11/1629; G06F 11/1637; G06F 11/1641;
(Continued)

(56) References Cited

U.S. PATENT DOCUMENTS

| 4,821,271 A | * | 4/1989 | Kini | ..................... G06F 11/1608 |
| | | | | 714/820 |
| 5,142,631 A | | 8/1992 | Murray et al. | |

(Continued)

FOREIGN PATENT DOCUMENTS

| DE | 102009000045 A1 | * | 7/2010 | .......... G06F 11/1645 |
| JP | 2005165961 A | | 12/2003 | |
| WO | WO2009131569 A1 | | 10/2009 | |

OTHER PUBLICATIONS

Wikipedia's Interrupt historical version published Jul. 12, 2018 https://en.wikipedia.org/w/index.php?title=Interrupt&oldid=849930938 (Year: 2018).*

(Continued)

*Primary Examiner* — Joseph O Schell

(57) ABSTRACT

Techniques are disclosed for processor synchronization within a reconfigurable computing environment for processor array redundancy. Processing elements are configured within a reconfigurable fabric to implement two or more redundant processors, where the two or more redundant processors are enabled for coincident operation. An agent is loaded on each of the two or more redundant processors, where the agent performs a function requiring data validation. The agent is fired on each of the two or more redundant processors to commence coincident operation. The coincident operation can include a lockstep operation. An output data result from each of the two or more redundant processors is compared to enable a data validation result. The data validation result is propagated. The propagating the data validation result can be based on comparing valid output data or can be based on comparing invalid output data.

21 Claims, 13 Drawing Sheets

Related U.S. Application Data filed on Dec. 6, 2018, provisional application No. 62/791,788, filed on Jan. 12, 2019, provisional application No. 62/800,431, filed on Feb. 2, 2019, provisional application No. 62/867,966, filed on Jun. 28, 2019.

(58) Field of Classification Search
CPC .............. G06F 11/165; G06F 11/1654; G06F 11/1628; G06F 11/273; G06F 11/2242; G06F 11/277; G06F 11/2236; G06F 11/18; G06F 11/181; G06F 11/183; G06F 11/184; G06F 11/185
See application file for complete search history.

(56) References Cited

U.S. PATENT DOCUMENTS

| | | | |
|---|---|---|---|
| 5,325,517 A * | 6/1994 | Baker | G06F 11/1641 |
| | | | 714/E11.015 |
| 5,682,495 A | 10/1997 | Beavers et al. | |
| 5,931,959 A * | 8/1999 | Kwiat | G06F 11/1489 |
| | | | 714/48 |
| 6,134,605 A | 10/2000 | Hudson et al. | |
| 6,363,470 B1 | 3/2002 | Laurenti et al. | |
| 6,427,192 B1 | 7/2002 | Roberts | |
| 6,820,213 B1 * | 11/2004 | Somers | G06F 11/165 |
| | | | 714/45 |
| 6,944,714 B2 | 9/2005 | Lesarte et al. | |
| 7,366,948 B2 * | 4/2008 | Michaelis | G06F 11/2079 |
| | | | 714/12 |
| 7,512,724 B1 | 3/2009 | Dennis et al. | |
| 7,877,627 B1 * | 1/2011 | Freydel | G06F 11/1633 |
| | | | 714/11 |
| 8,314,636 B2 | 11/2012 | Hutton et al. | |
| 8,341,469 B2 | 12/2012 | Miyama et al. | |
| 8,493,974 B1 | 7/2013 | Nelson et al. | |
| 9,977,720 B2 * | 5/2018 | Fujimoto | G06F 11/1695 |
| 10,606,764 B1 * | 3/2020 | Kravit | G06F 11/1629 |
| 2002/0152419 A1 * | 10/2002 | McLoughlin | G06F 11/165 |
| | | | 714/11 |
| 2002/0167337 A1 | 11/2002 | Chelcea et al. | |
| 2003/0014597 A1 | 1/2003 | van de Waerdt | |
| 2003/0061535 A1 * | 3/2003 | Bickel | G06F 11/1675 |
| | | | 714/E11.069 |
| 2004/0215882 A1 | 10/2004 | Alexander et al. | |
| 2004/0255185 A1 | 12/2004 | Fujiyama et al. | |
| 2005/0160228 A1 | 7/2005 | Teruyama | |
| 2005/0198476 A1 | 9/2005 | Gazsi et al. | |
| 2005/0223172 A1 | 10/2005 | Bortfeld | |
| 2007/0133399 A1 | 6/2007 | Gangwal | |
| 2007/0288776 A1 | 12/2007 | DeMent et al. | |
| 2008/0168303 A1 | 7/2008 | Spear et al. | |
| 2009/0089605 A1 | 4/2009 | Westwick et al. | |
| 2009/0282220 A1 | 11/2009 | Norden | |
| 2010/0013517 A1 * | 1/2010 | Manohar | H03K 19/17728 |
| | | | 326/38 |
| 2010/0281448 A1 | 11/2010 | He | |
| 2011/0153926 A1 | 6/2011 | Fang et al. | |
| 2011/0199117 A1 | 8/2011 | Hutchings et al. | |
| 2011/0296112 A1 | 12/2011 | Li et al. | |
| 2012/0119781 A1 | 5/2012 | Manohar et al. | |
| 2012/0235839 A1 | 9/2012 | Mazumdar et al. | |
| 2012/0239908 A1 | 9/2012 | Chen et al. | |
| 2012/0303897 A1 | 11/2012 | Pullagondapatti et al. | |
| 2012/0319730 A1 | 12/2012 | Fitton et al. | |
| 2013/0009666 A1 | 1/2013 | Hutton et al. | |
| 2013/0009667 A1 | 1/2013 | Calhoun et al. | |
| 2013/0043902 A1 | 2/2013 | Rahim et al. | |
| 2013/0159799 A1 * | 6/2013 | Brown | G06F 11/2242 |
| | | | 714/E11.155 |
| 2013/0304991 A1 | 11/2013 | Bottcher et al. | |
| 2014/0075144 A1 | 3/2014 | Sanders et al. | |
| 2014/0359350 A1 * | 12/2014 | Plank | G06F 9/5027 |
| | | | 714/10 |
| 2014/0372731 A1 | 12/2014 | Nystad et al. | |
| 2015/0123707 A1 | 5/2015 | Nicol | |
| 2015/0347297 A1 | 12/2015 | Hagersten et al. | |
| 2016/0019158 A1 | 1/2016 | Palacharla et al. | |
| 2016/0321078 A1 | 11/2016 | Bailey | |
| 2016/0328320 A1 | 11/2016 | Dooley et al. | |
| 2017/0032285 A1 | 2/2017 | Sharma et al. | |
| 2017/0061279 A1 | 3/2017 | Yang et al. | |
| 2017/0140263 A1 | 5/2017 | Kaiser et al. | |
| 2018/0312193 A1 * | 11/2018 | Arnold | B62D 5/0466 |
| 2019/0188093 A1 * | 6/2019 | Eckelmann-Wendt | |
| | | | G06F 11/1641 |

OTHER PUBLICATIONS

International Search Report dated Feb. 6, 2015 for PCT/US2014/063591.

Courbariaux, M., Bengio, Y., & David, J. P. (2014). Training deep neural networks with low precision multiplications. arXiv preprint arXiv:1412.7024.

Ioffe, S., & Szegedy, C. (2015). Batch normalization: Accelerating deep network training by reducing internal covariate shift. arXiv preprint arXiv:1502.03167.

Gupta, S., Agrawal, A., Gopalakrishnan, K., & Narayanan, P. (Jun. 2015). Deep learning with limited numerical precision. In International Conference on Machine Learning (pp. 1737-1746).

Lai, L., Suda, N., & Chandra, V. (2017). Deep convolutional neural network inference with floating-point weights and fixed-point activations. arXiv preprint arXiv:1703.03073.

* cited by examiner

FAIL-SAFE SEMI-AUTONOMOUS OR AUTONOMOUS VEHICLE PROCESSOR ARRAY REDUNDANCY WHICH PERMITS AN AGENT TO PERFORM A FUNCTION BASED ON COMPARING VALID OUTPUT FROM SETS OF REDUNDANT PROCESSORS

RELATED APPLICATIONS

This application claims the benefit of U.S. provisional patent applications "Processor Array Redundancy" Ser. No. 62/703,899, filed Jul. 27, 2018, "Neural Network Processing Using Specialized Data Representation" Ser. No. 62/776,032, filed Dec. 6, 2018, "Address Manipulation Using Indices and Tags" Ser. No. 62/791,788, filed Jan. 12, 2019, "Neural Network Processing Using Mixed-Precision Data Representation" Ser. No. 62/800,431, filed Feb. 2, 2019, and "Mixed-Precision Data Computation for Neural Network Reduction Operands" Ser. No. 62/867,966, filed Jun. 28, 2019.

Each of the foregoing applications is hereby incorporated by reference in its entirety.

FIELD OF ART

This application relates generally to data validation and more particularly to processor array redundancy.

BACKGROUND

The increase in the volume of data collected from devices and people continues unfettered. Data is collected from sources ranging from personal electronic devices, online user activities such as shopping, Internet of Things (IoT) devices, smart homes, and many other sources. The data is analyzed by researchers, business people, and governments for a variety of purposes. The data is collected and aggregated into datasets often called "big data". Analysis of this immense amount of data is intractable using conventional processors and techniques, for the simple reason that the datasets far outstrip the capabilities of the processors and techniques. Data collection is further complicated by additional data needs that include the capture, storage, maintenance, access, transmission, and visualization of the data. These further data processing and handling requirements quickly surpass the traditional system capabilities such as storage and exchange or networking. The data would be valueless without tractable and scalable approaches to data processing and handling. Innovative hardware architectures and software techniques, algorithms, heuristics, and so on, are required. Dataset owners or users who have access to the datasets are intellectually or financially motivated to analyze the data contained therein. The data analysis is typically conducted for business and research purposes. Other analysis purposes include business analytics; disease detection, tracking, and control; crime detection and prevention; meteorology; and complex science and engineering simulations, to name only a very few. Advanced data analysis techniques are finding applications such as predictive analytics. Further approaches include the application of machine learning and deep learning techniques in support of the data analysis.

Neural networks are among the most promising architectural candidates for the data handling and processing tasks. The neural networks can be based on reconfigurable processor hardware, field programmable gate arrays, application specific gate arrays, custom integrated circuits or chips, and other configurable and reconfigurable architectures. Reconfigurable computing architectures can advantageously integrate many desirable characteristics of hardware and software techniques. A reconfigurable computing architecture can be "recoded" (reprogrammed or reconfigured) to adapt the architecture to a variety of computational approaches. In addition, the reconfigurable architecture approaches can implement an underlying high-performance hardware architecture. Reconfigurable architectures may be arranged for applications that require high performance computing, then rearranged for the many other applications. Applications, including digital signal processing (DSP), medical image processing, machine learning, matrix computations, tensor computations, image data analysis, and so on, are successfully enabled by the capabilities of a reconfigurable architecture. The reconfigurable architecture is particularly well suited to data analysis when the data can include specific types of data, large quantities of unstructured data, sample data, and the like. The reconfigurable architecture can be configured to achieve these and other processing techniques.

Computing architectures that are based on reconfigurable processor hardware offer one highly promising technique that is well suited to processing large or complex data sets, performing complex analytical operations, and executing other processing applications. Reconfigurable computing integrates many desirable characteristics of hardware and software techniques, using those techniques to its advantage. A reconfigurable computing architecture is "recoded" (re-programmed) to adapt the architecture to a variety of computational approaches, similar to software. Further, the reconfigurable architecture approach can implement an underlying high-performance hardware architecture. A reconfigurable fabric architecture can be applied to reconfigurable computing. Reconfigurable fabrics may be arranged in a variety of configurations or topologies, where the topologies are coded, or programmed, for the many applications that require high performance computing. Applications such digital signal processing (DSP), medical image processing, machine learning matrix computations, tensor computations, data analysis, and so on, are successfully served by the capabilities of a reconfigurable fabric. The reconfigurable fabric is particularly well suited to data analysis when the data can include specific types of data, large quantities of unstructured data, sample data, and the like. The reconfigurable fabrics can be coded or scheduled to achieve these and other processing techniques. Further, the reconfigurable fabric can be scheduled to represent a variety of computer architectures that can perform computations more efficiently.

SUMMARY

An agent can represent a process that can be executed on a processor. The agent can represent a node of a graph such as a data flow graph, where the data flow graph describes both the flow of data and the operations performed on the data as the data flows through the graph. The data flow graph includes nodes that represent the logical, mathematical, Boolean, matrix, tensor, processing, comparison, or other operations to be performed on data, and arcs that represent the flow of the data between and among the nodes. A data flow graph is an explicative, visual flow representation that is particularly suited to understanding a variety of exceedingly complex computing tasks. The data flow graph represents the data calculations performed by the agents and the flow of data required to perform those calculations. The calculations can be applied to such tasks as data validation. The data validation can be used to increase confidence in the resulting data from the processing performed by agents. The data validation can be required before complex decisions can proceed, such as decisions relating to control of an autonomous vehicle.

A reconfigurable fabric can be reconfigured by adapting it or "recoding" it to implement a given data flow graph. The data flow graph itself can be adapted by changing code used to configure elements of the reconfigurable fabric. The reconfigurable fabric can include computational or processor elements, storage elements, switching elements for data transfer, control elements, and so on. The reconfigurable fabrics are coded to implement a variety of processing topologies to implement data flow graphs. The reconfigurable fabric can be configured by coding or scheduling the reconfigurable fabric to execute a variety of logical operations such as Boolean operations, matrix operations, tensor operations, mathematical operations, gradient calculations, etc. The scheduling of the reconfigurable fabric can be changed based on a data flow graph.

Embodiments include a processor-implemented method for data validation comprising: configuring a plurality of processing elements within a reconfigurable fabric to implement two or more redundant processors, wherein the two or more redundant processors are enabled for coincident operation; loading an agent on each of the two or more redundant processors, wherein the agent performs a function requiring data validation; firing the agent on each of the two or more redundant processors to commence coincident operation; comparing an output data result from each of the two or more redundant processors to enable a data validation result; and propagating the data validation result. In embodiments, the coincident operation comprises a lockstep operation. In embodiments, the coincident operation comprises synchronizing the two or more redundant processors on a fine grain timing basis. And in embodiments, the fine grain timing basis keeps the two or more redundant processors coordinated on a tic boundary. In other embodiments, the coincident operation comprises synchronizing the two or more redundant processors on a coarse grain timing basis. And in further embodiments, the coarse grain timing basis keeps the two or more redundant processors coordinated on a cycle boundary.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
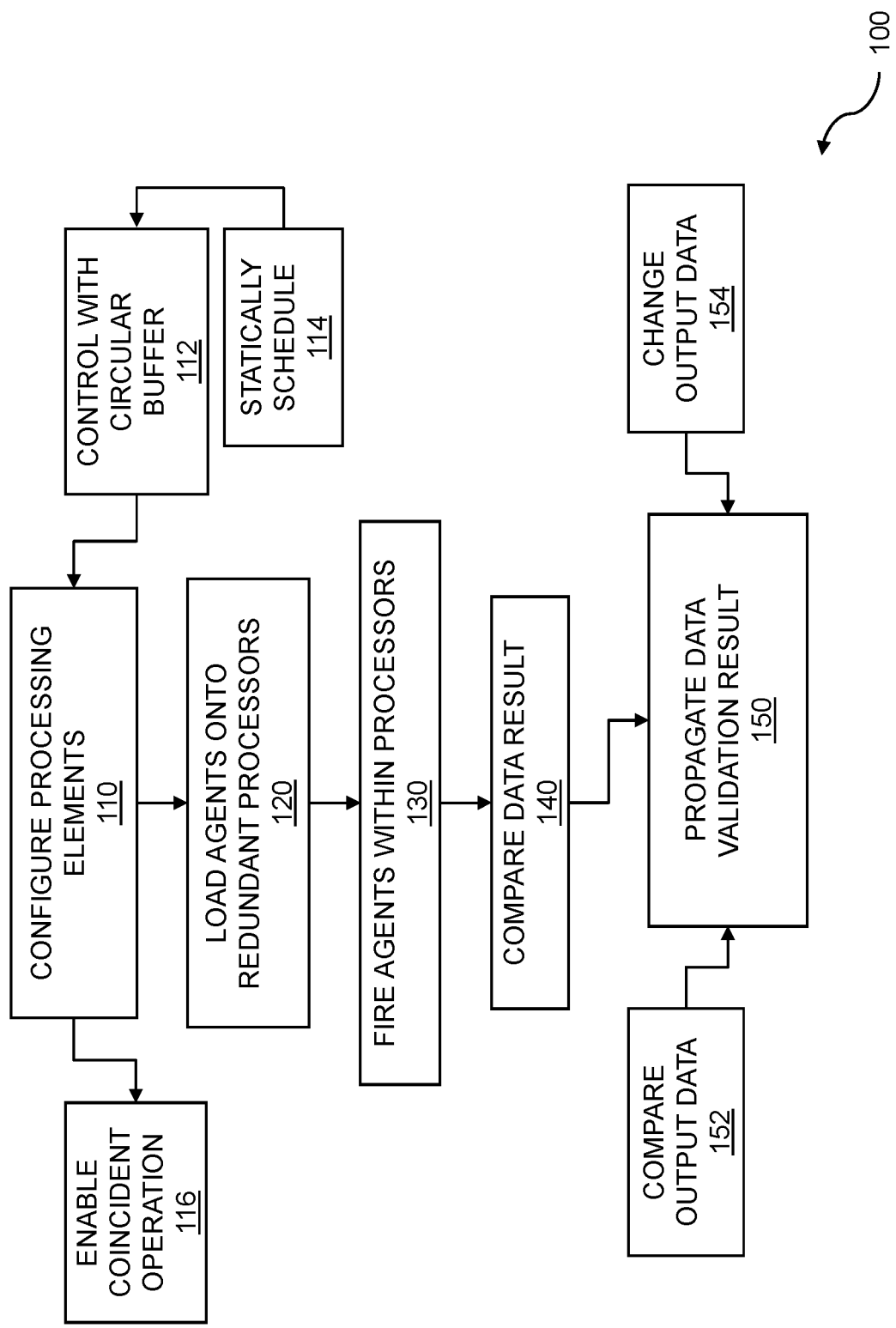
FIG. 1 is a flow diagram for processor array redundancy.

Processor synchronization can be performed using redundant processor arrays. The processor array redundancy can be configured within a reconfigurable computing environment such as a reconfigurable fabric. Electrical and electronic devices find many systems applications in such areas as healthcare, manufacturing, transportation, and so on. As reliance on these systems increases, along with the potential risk to life or property, reliability of the systems becomes paramount. In the area of transportation for example, there is significant interest in the use of autonomous and semi-autonomous vehicles such as self-driving automobiles or trucks. To ensure the safe operation of such vehicles, the data that is used to make critical decisions such as whether to brake, accelerate, steer, or perform an evasive action must be valid.

Techniques for processor array redundancy for data validation are disclosed. The processor array redundancy can be configured within a plurality of processing elements, such as the plurality of processing elements within a reconfigurable fabric. The processor array redundancy can be implemented on a server, a computing device, a processor device, a reconfigurable computing device, an integrated circuit or chip, and so on. A reconfigurable computing device can include a reconfigurable fabric. The reconfigurable fabric is designed to incorporate essential performance features and coding features, based on both hardware and software techniques. The hardware techniques include computer architectures specifically designed for high performance computations. The software techniques enable the hardware to be readily reconfigured for specific computational tasks such as firing processes, processing data flow graphs, performing machine learning tasks, and so on. A reconfigurable fabric can include one or more element types, where the element types can include processing elements, storage elements, switching elements, control elements, communication elements, and so on. A given element can be configured to perform a variety of architectural and computational functions, operations, or tasks based on the type of element and by the programming, coding, or "scheduling" of the element. Elements of the reconfigurable fabric can be arranged in quads of elements, where the quads include processing elements, shared storage elements such as first in first out (FIFO) elements or direct memory access (DMA) elements, switching elements, rotating circular buffers for control of the elements, communications paths, registers, buffers, and the like. An element or subset of elements within the reconfigurable fabric, such as a quad of elements, can be controlled by providing a "schedule", such as code or instructions, to one or more circular buffers. The code can be executed by enabling—or configuring—the circular buffers to rotate. Code such as agents, kernels, and so on, further can be provided to elements within the reconfigurable fabric so that the reconfigurable fabric can perform computational tasks such as logical operations including Boolean operations, matrix computations, tensor operations, mathematical operations, machine learning operations, gradient operations, etc. The various elements of the reconfigurable fabric can be controlled by the rotating circular buffers, where the one or more circular buffers can be of the same length or of differing lengths. Agents, functions, routines, algorithms, instructions, codes, procedures, processes, etc., can be loaded into a given circular buffer. The rotation of the given circular buffer ensures that the same series of coded steps or instructions is repeated as required by the processing tasks assigned to a processing element of the reconfigurable fabric. The one or more rotating circular buffers can be statically scheduled.

Synchronization can use processor array redundancy. A plurality of processing elements within a reconfigurable fabric is configured to implement two or more redundant processors. The redundant processors can be cores, hierarchical processors, and so on. The two or more redundant processors are enabled for coincident operation. The coincident operation can include parallel operation, synchronized operation, concurrent operation, and so on. The coincident operation can include a lockstep operation. An agent can be loaded on each of the two or more redundant processors, wherein the agent performs a function requiring data validation. The two or more redundant processors can be configured as master-slave processors, master-master processors, a master processor and a standby master processor, etc. The agent on each of the two or more redundant processors is fired to commence coincident operation. The firing of the agent can be based on receiving a signal such as a fire signal, receiving valid input data, initiating rotation of a scheduled rotating circular buffer, and the like. An output data result from each of the two or more redundant processors can enable a data validation result. The comparing can be based on two or more valid output data results, at least one valid output data result, a majority vote based on valid output data results, etc. The data validation result is propagated, where the propagation can be based on comparison of valid or invalid data, changes from valid output data to invalid output data or invalid output data to valid output data, and the like.

FIG. 1 is a flow diagram for processor array redundancy. Agents can perform or execute functions that require data validation. The agents which can represent nodes of a graph such as a process graph, a data flow graph, etc., can perform data validation for applications including failsafe applications, vehicle safety applications, and so on. The flow 100 includes configuring a plurality of processing elements 110 within a reconfigurable fabric to implement two or more redundant processors. A reconfigurable fabric can include a variety of processing elements. The processing elements within the reconfigurable fabric can include processing elements, switching elements, storage elements, and the like. The reconfigurable fabric can also access storage beyond the reconfigurable fabric such as direct memory access (DMA) storage. The elements of the reconfigurable fabric can be grouped, where a group can include a number of processing elements, interconnection paths, access to storage such as hybrid memory cube (HMC) storage, and the like. A group of processing elements can include a quad of processing elements. The elements of the reconfigurable fabric are organized in other group sizes including duos, octets, and so on.

The configuring can enable ISO functionality. The International Organization for Standards (ISO) works with experts to share knowledge and to develop standards that can be used internationally. The standards can be consensus-based, relevant to the market to which the standard can be applied, and voluntary. Since customers prefer to purchase products that are safe, reliable, interoperable, etc., then manufacturers often choose to "opt-in" to following the standards. Of the many standards available, many apply to safety. One example of a safety standard is ISO Standard 26262, titled "Road Vehicles Functional Safety". This standard enables road vehicle functional safety, particularly in relation to electrical or electronic systems within road vehicles.

Returning to processing elements, in embodiments, the first plurality of processing elements can include a hum generation fabric, where the hum generation fabric can control or coordinate operation of other pluralities of processing elements. The hum generation fabric can operate at a hum frequency. In embodiments, the plurality of processing elements can form two or more clusters within a reconfigurable fabric. The clusters can comprise processing elements, storage elements, switching elements, etc. In embodiments, processing elements within the plurality of processing elements can each be controlled with circular buffers 112. The circular buffers can include instructions, codes, steps, and so on for configuring the processing elements, for controlling the processing elements, etc. The circular buffers can include instructions, code, and so on, that can configure the processing elements within the reconfigurable array. In embodiments, the circular buffers can be statically scheduled 114. The reconfigurable fabric can be self-clocked. In embodiments, the reconfigurable fabric is self-clocked on a hum basis. A hum frequency can be a frequency at which multiple clusters of processing elements within a reconfigurable fabric self-synchronize to each other. The hum generation circuit can comprise the fabric. The hum generation fabric can form a clock generation structure. One or more functional circuits, such as adders, shifters, comparators, and/or flip flops, among others, can each perform a function over a finite period of time. The operating frequency of multiple clusters can be bounded by the slowest functional circuit within the clusters. In embodiments, each functional circuit operates over one cycle or tic of the clock. The tic cycle can be a single cycle of the hum generated self-clocking signal. With a self-clocking design, it can be a challenge to select a hum frequency that is compatible with each of the various functional logic circuits within each cluster. If the hum frequency is not correct, then the overall operation of the integrated circuit might be compromised.

In embodiments, the two or more redundant processors are enabled for coincident operation 116. The coincident operation can include parallel operation, coordinated operation, simultaneous operation, and so on. In embodiments, the coincident operation can include a lockstep operation. The coincident operation of the two or more redundant processors can be accomplished using a variety of techniques. In embodiments, the coincident operation can include synchronizing the two or more redundant processes on a fine grain timing basis. In the context of a reconfigurable fabric, processes running on processors can be partitioned into steps, groups of steps, or stages of a pipeline. The pipelining of the process can reduce the number of processing tasks that take place on a given processor for each step, or stage of the pipeline, and can increase the rate of the flow of data through the pipeline. By partitioning the processes into more steps or stages of the pipeline, a "finer grain" can be achieved. The finer grain can reduce sizes of buffers used to access memory such as external memory or DMA memory, can reduce memory bandwidth needs, can reduce the sizes of buffers internal to the reconfigurable fabric, and so on.

In embodiments, the fine grain timing basis can keep the two or more redundant processors coordinated on a tic boundary. A tic boundary can refer to a processing step of a given process, a processing step for a plurality of processes, the processing of a set of data, etc. In embodiments, the coincident operation can include synchronizing the two or more redundant processors on a coarse grain timing basis. The coarse grain timing basis can include fewer groups of steps or pipeline states. In embodiments, the coarse grain timing basis can keep the two or more redundant processors coordinated on a cycle boundary. The one or more timing bases can relate to clusters within the reconfigurable fabric. In embodiments, a cluster within two or more clusters can be synchronized to a tic cycle boundary. The clusters of a plurality of clusters need not all operate within the same cycle or tic cycle. In embodiments, the cluster within the two or more clusters and a second cluster within the two or more clusters can operate on different tic cycles. That is, the cluster and the second cluster can be timed or self-timed and can operate independently of one another. In embodiments, the cluster within the two or more clusters and a second cluster within the two or more clusters can operate on different tic clocks. The ability of a cluster and a second cluster to operate on different clock tics allows a system to operate based on the flow of data rather than on the flow of control signals such as clocks throughout the system. In embodiments, the two or more clusters comprise a data flow processor. A data flow processor operates based on the flow of data through the processor. In embodiments, the data flow processor implements a data flow graph. The data flow graph can include nodes and arcs, where the nodes can represent operations on data, and the arcs can represent the flow of data between or among nodes. Other types of graphs such as flow graphs may also be included.

The number of redundant processors into which the plurality of processing elements within a reconfigurable fabric can be configured can depend on the number of processing elements within the reconfigurable array, the number of processors required by a particular data validation technique, and so on. In embodiments, the two or more processors are exactly two processors. The exactly two processors can operate as a pair of cores or processors, as ordered processors, and so on. In embodiments, the exactly two processors can include a master-slave processor system. The master-slave processor system can be based on a processor precedent or hierarchy. The master-slave processor system can include the master controlling the slave. In embodiments, the master-slave processing system can enable data validation when both of the exactly two processors output the same output data result. The slave processor can "back up" or shadow the master processor as a check or verification of the process performed by the master. In other embodiments, the master-slave processing system can enable data validation when either of the exactly two processors outputs a valid result. Validating a data result based on either processor outputting a valid result can include a backup or failover technique in the event that a processor fails or gives erroneous output results. In embodiments, a slave processor within the master-slave processor system can provide a standby master processor capability. The slave with a standby master processor capability can be swapped with a master processor based on the master processor failing, producing erroneous results, and so on. In other embodiments, the exactly two processors can include a master-master processor system. In a master-master processor system, the two processors can operate with a similar priority, precedence, etc.

Other numbers of processors can be used for processor array redundancy. In embodiments, the two or more processors are exactly three processors. The exactly three processors can be configured as a master and two slaves, two masters and a slave, or three masters. The exactly three processors comprise a triple-redundancy processor system. A triple-redundancy processor system can include the three processors executing the same process for data validation. Various techniques can be used for validating data. In embodiments, the triple-redundancy processing system can enable data validation when two or more of the exactly three processors output the same output data result. The three processors outputting the same output data result can yield a high degree of confidence that the output data is valid. In other embodiments, the triple-redundancy processing system can enable data validation when at least one of the exactly three processors outputs a valid output data result. One processor outputting a valid output data result can be used as a failsafe technique when the other two of the exactly three processors may or may not be outputting a valid output data result. In further embodiments, the triple-redundancy processing system can enable data validation using voting. Various voting techniques may be used. In embodiments, the data validation can be based on a majority vote. Other odd numbers of processors, greater than three processors, can be used for a majority or (N/2)+1 vote. Other voting strategies, such as a weighted or biased vote, may be used as when a master outvotes a slave or slaves.

The flow 100 includes loading an agent on each of the two or more redundant processors 120, where the agent performs a function requiring data validation. An agent, such as a process agent, can represent processing nodes of the data flow graph. The data flow graph can represent techniques that can be used to validate data. The data validation can be applied to safety such as vehicle safety. The data flow graph may also represent a network such as a neural network or other network. The loading agents can include loading or scheduling rotating circular buffers with instructions or code. The flow 100 includes firing the agent on each of the two or more redundant processors 130 to commence coincident operation. The firing the agent can be accomplished using a fire signal, loading valid data, initiating an interrupt, scheduling a rotating circular buffer, and so on. The coincident operation can include parallel operation, simultaneous operation, and so on. In embodiments, the coincident operation includes a lockstep operation.

The flow 100 includes comparing an output data result 140 from each of the two or more redundant processors to enable a data validation result. Various techniques can be used for comparing output data. The comparing output data can include comparing integer, real, or floating-point values; comparing strings of characters such as text; comparing to a threshold value; and so on. Results of the comparing can be decided by a vote, such as a majority vote, by two or more processors. The comparing can be based on at least one valid output data result.

The flow 100 includes propagating the data validation result 150. As discussed throughout, the data validation result can be based on receiving valid output data results, receiving a single valid output data result, receiving a vote, and so on. The vote can include a majority vote. In embodiments, the propagating the data validation result can be based on comparing output data 152. The data that is compared can be valid data or invalid data. In embodiments, the propagating the data validation result can be based on comparing valid output data, where the valid output data is compared from two or more processors. Further, the propagating the data validation result can be based on comparing invalid output data, where the invalid data can indicate that a processor has not completed processing, did not receive valid input data, is faulty, and so on. In other embodiments, the propagating the data validation result can be based on changing output data 154. The data that changes can include invalid data or valid data. Further embodiments include propagating the changed data validation result when invalid output data changes to valid output data. Invalid data can change to valid data when a processor has processed available input data, has completed a process, has generated output data, and the like. Other further embodiments include propagating the changed data validation result when valid output data changes to invalid output data. Valid data can change to invalid data when a processor begins processing new data. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
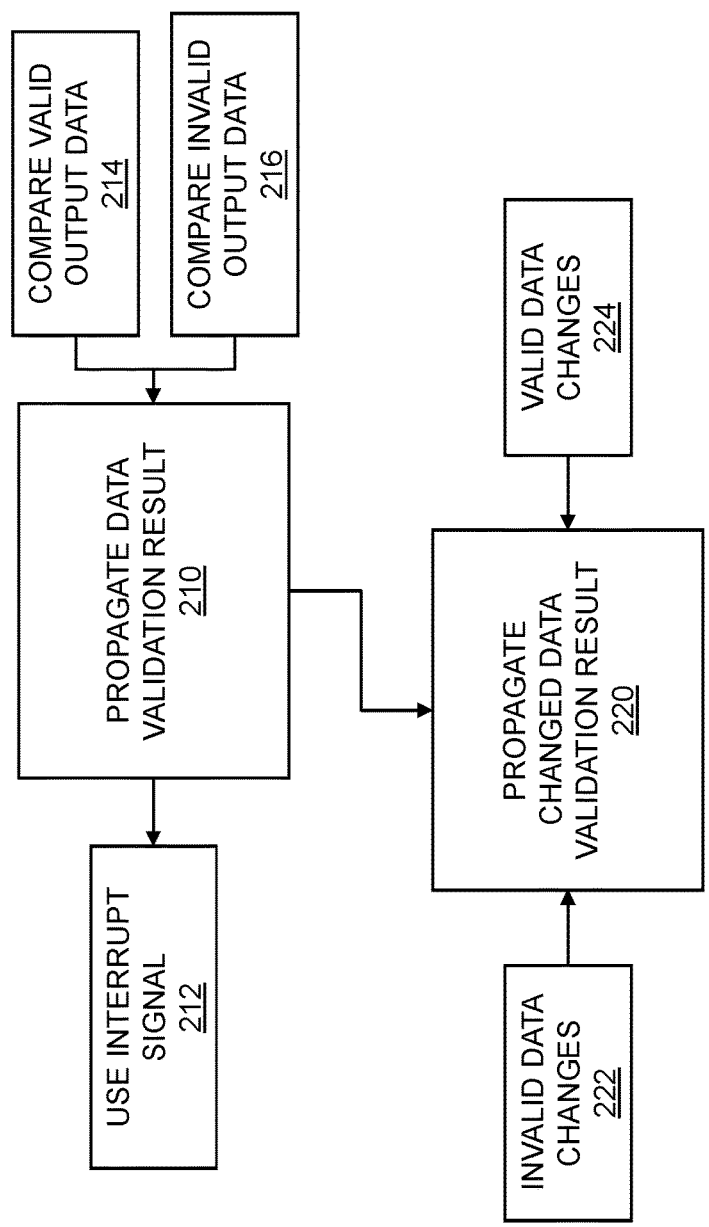
FIG. 2 is a flow diagram for propagating the data validation result.

FIG. 2 is a flow diagram for propagating a data validation result. Data validation can include propagating a data validation result to enable techniques such as data validation for vehicle safety. The data validation result can be determined based on processor array redundancy. Processing elements within a reconfigurable fabric are configured to implement redundant processors. The redundant processors are enabled for coincident operation. An agent is loaded onto the redundant processors. The agent can perform a function that requires data validation. The agent is fired to commence coincident operation. An output data result from each processor is compared to enable a data validation result, and the data validation result is propagated.

The flow 200 includes propagating the data validation result 210. A data validation result can be propagated to enable techniques or applications for which data validation is required. In embodiments, data validation can be required for applications such as vehicle safety. As discussed throughout, a vehicle can include a human-operated vehicle, a semiautonomous vehicle, an autonomous vehicle, and so on. The data validation can include validating vehicle data such as speed, direction, throttle position, brake application, gear engagement, steering wheel position, wheel rotation, and so on. The vehicle data can include other sensor data such as ranging data which includes distances to any adjacent vehicles, thermal or infrared (IR) data for detection of people or animals in the path of travel, and so on. In order for the vehicle to be operated safely, the vehicle or sensor data can be validated. The validated data can be used for adjusting vehicle operating status such as accelerating, decelerating, applying brakes, performing an emergency maneuver, and so on. The data validation can support failsafe operation of the vehicle.

In embodiments, the propagating can be accomplished using an interrupt signal 212. The interrupt signal, such as an interrupt request (IRQ), can be processed by an interrupt handler, a processor, a process control manager, and so on. The interrupt signal can be asynchronous. In embodiments, the propagating the data validation result can be based on comparing valid output data 214. The reconfigurable fabric, within which processing elements can be configured to implement one or more redundant processors, can be implemented using a variety of logic families or electronic circuit types. In embodiments, the reconfigurable fabric can be implemented using asynchronous circuits, self-timed circuits, and so on. In embodiments, the plurality of processing elements can include an asynchronous reconfigurable fabric. An asynchronous reconfigurable fabric can operate without the need for a clock signal, system clock, etc., from beyond the reconfigurable fabric. In other embodiments, the asynchronous reconfigurable fabric can be self-timed. A self-timed reconfigurable fabric can operate based on the arrival of valid data, the absence of invalid data, and so on. Asynchonicity may further refer to other operations performed by the reconfigurable fabric. In further embodiments, the asynchronous reconfigurable fabric is asynchronous with respect to system memory. The reconfigurable fabric can also be implemented based on a variety of architectures such as data flow architectures. Depending on the logic family, electronic circuit type, or fabric architecture used, valid output data can be computed by the two or more processors. In other embodiments, the propagating the data validation result can be based on comparing invalid output data 216. Invalid output data can be based on a failure to process valid data, a lack of valid data, the presence of invalid data, and so on. The invalid output data may occur due to a sensor or camera failure, a processor or communication failure, a lack of valid data, and so on. Comparing invalid data can trigger an error processing technique.

The flow 200 includes propagating a changed data validation result 220. Change in a data validation result can be based on a computation, a reset, an error, and so on. In embodiments, propagating a changed data validation can result when invalid output data changes to valid output data 222. The change from invalid output data to valid output data can cause an interrupt, a fire signal, a done signal, etc. The change from invalid output data to valid data can indicate that the output data is ready to be processed by a downstream processor, that is, a processor that is awaiting valid data. In other embodiments, propagating a changed data validation can result when valid output data changes to invalid output data 224. The change from valid output data to invalid output data can indicate that all valid output data has been collected from a downstream processor, that the upstream processor is commencing processing or awaiting valid input data, and so on.

Various embodiments of the flow 200 can be included in a computer program product embodied in a non-transitory computer readable medium that includes code executable by one or more processors.

Figure 3:
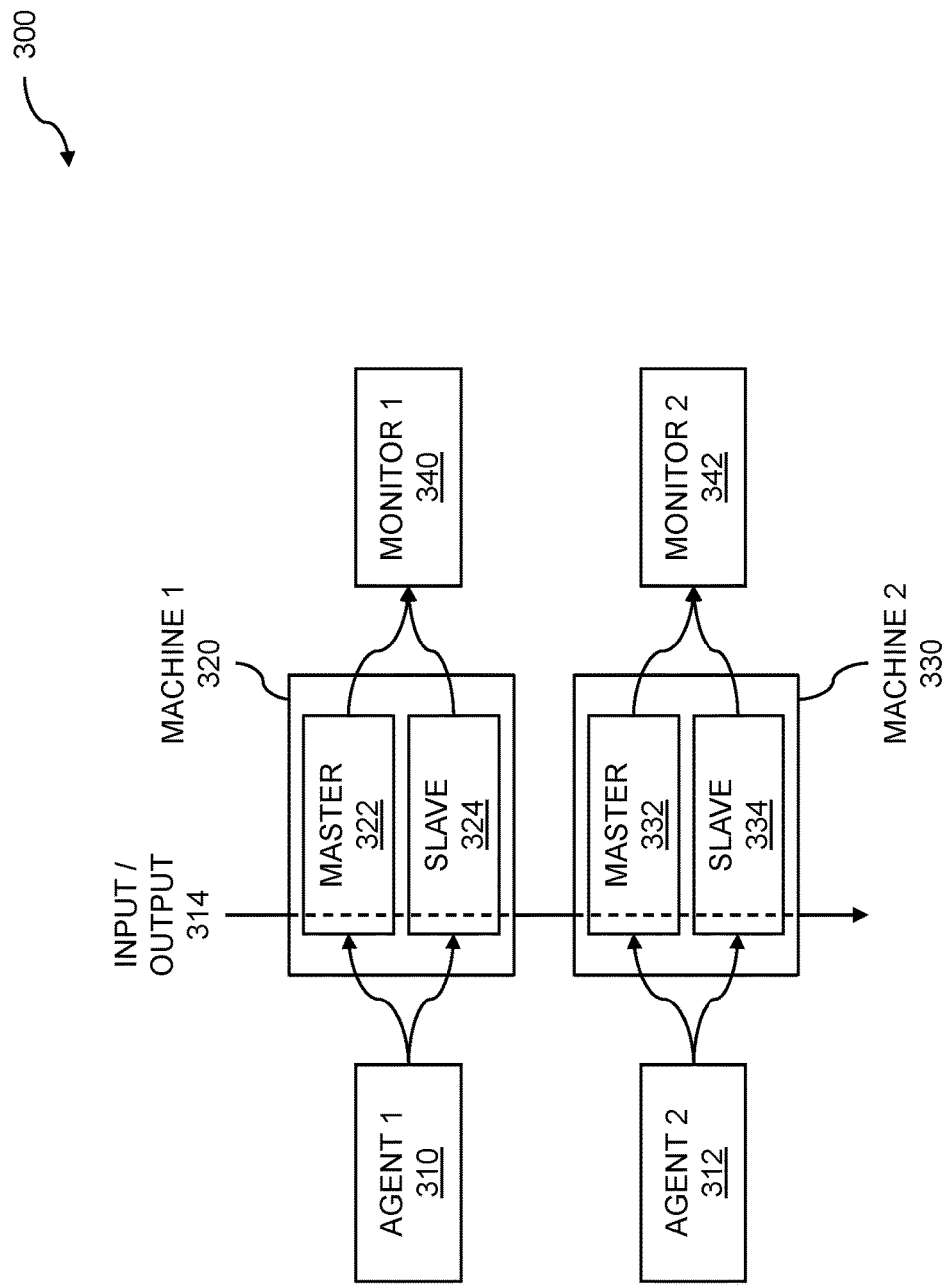
FIG. 3 shows redundancy for agent loading.

FIG. 3 shows redundancy for agent loading. Agents can be loaded onto redundant processors, then fired or executed on the redundant processors to support data validation. The data validation can be accomplished using processor array redundancy. Processing elements within a reconfigurable fabric can be configured to implement two or more redundant processors. The two or more redundant processors can be enabled for coincident operation. An agent can be loaded on each of the two or more redundant processors. The function that can be performed by the agent can include a function that requires data validation. The agent can be initiated or fired on each of the two or more redundant processors to commence coincident operation. The coincident operation can include parallel processing, lockstep processing, and so on. An output data result from each of the two or more redundant processors can be compared to enable a data validation result. The data validation result can be propagated.

Redundancy for agent loading is shown 300. Agents can be loaded onto machines, such as agent 1 310 loaded onto machine 1 320, and agent 2 312 loaded onto machine 2 330. The machines can include two or more redundant processors. Input and output data 314 can be provided or received from the two or more redundant processors. In embodiments, exactly two processors can include a master-slave processor system. In the example 300, agent 1 can be loaded onto master 322 and slave 324; and agent 2 can be loaded onto master 332 and slave 334. Agent 1 can be the same agent as agent 2. The two processors of the example machines can be configured in a different master-slave configuration. In embodiments, a slave processor within the master-slave processor system can provide a standby master processor capability. A slave processor that includes master processor capability can be swapped with a corresponding master processor. The swapping can be executed when the master processor produces erroneous results, inconsistent results, or otherwise indicates that the operation of the master processor may be suspect. In other embodiments, the exactly two processors can include a master-master processor system. A slave processor that includes master processor capability may be used in addition to the master processor of a given machine, thus implementing the master-master processor system.

One or more monitors, such as monitor 1 340 and monitor 2 342, can be used to compare an output data result from each of the two or more redundant processors to enable a data validation result. In the example, monitor 1 340 can monitor, compare, analyze, etc., the output data result from the master 322 processor and the slave 324 processor. Monitor 2 342 can monitor the output data result from the master 332 processor and the slave 334 processor. The one or more monitors can enable data validation when both of the exactly two processors output the same output data result, or when either of the exactly two processors outputs a valid result. While two agents, two machines, and two monitors are shown, other numbers of agents can be loaded onto other numbers of machines, the outputs of which are monitored by other numbers of monitors. In the case of three processors or triple-redundant processors, the triple-redundancy processing system can enable data validation when two or more of the exactly three processors output the same output data result. That is, the validation can be based on a majority or other vote. A vote can include a weighted or biased vote in which a processor has a priority higher than another processor. In other embodiments, the triple-redundancy processing system enables data validation when at least one of the exactly three processors outputs a valid output data result. The monitor can propagate the data validation result. The propagating the data validation result further can be based on comparing valid or invalid data, data changes such as invalid output data changing to valid data or valid output data changing to invalid data, and so on.

Figure 4:
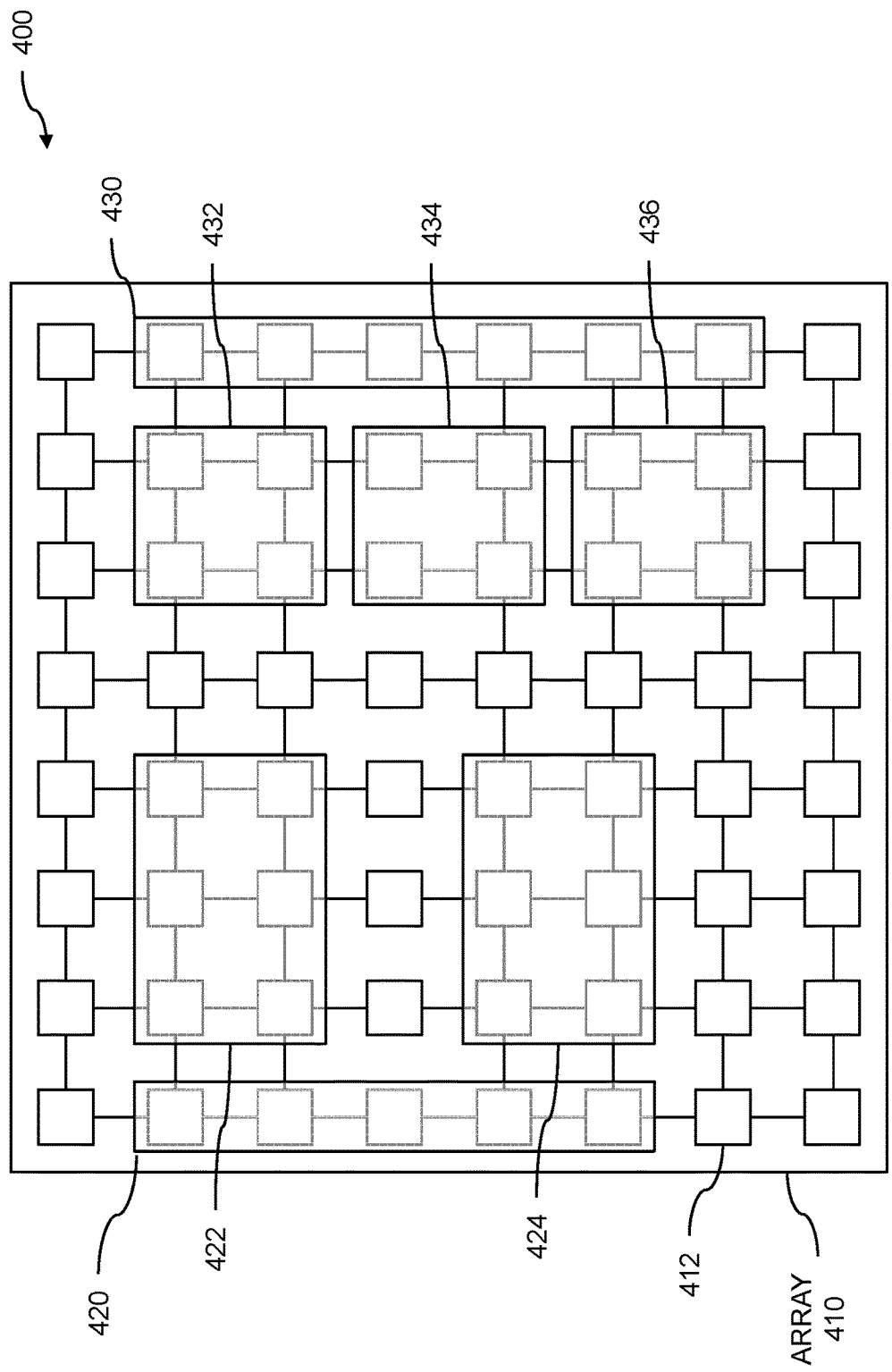
FIG. 4 illustrates redundant allocation techniques.

FIG. 4 illustrates redundant allocation techniques. Data validation for a variety of usage scenarios such as safety can be based on processor array redundancy. Two or more processors can be used for array redundancy within a reconfigurable fabric. A plurality of processing elements within a reconfigurable fabric can be configured to implement two or more redundant processors. The two or more redundant processors can be enabled for coincident operation. An agent can be loaded on each of the two or more redundant processors, where the agent performs a function requiring data validation. The function can include a vehicle safety function. The agent is fired on each of the two or more redundant processors to commence coincident operation. The coincident operation can include a lockstep operation. An output data result from each of the two or more redundant processors can be compared to enable a data validation result, and the data validation result can be propagated.

The two or more redundant processors can be allocated within a reconfigurable array 400. A reconfigurable array 410 or reconfigurable fabric can include a plurality of elements such as element 412. The elements of the reconfigurable fabric can include processing elements, storage elements, switching elements, and so on. The elements can be coupled to communications paths, where the communications paths can enable communication with other elements. The inter-element communications can include nearest neighbor communications. Communication with elements beyond nearest neighbor elements may be accomplished using switching elements, inter-element communications paths, and the like.

As discussed throughout, a plurality of processing elements within a reconfigurable fabric can be configured to implement the two or more redundant processors. Two redundant allocation configurations are illustrated. One allocation configuration includes two processors. The two processors can implement dual redundancy. The dual redundancy allocations can include a plurality of elements 420 and pluralities of elements configured to implement two redundant processors 422 and 424. The plurality of elements 420 can be used for loading an agent onto the processors 422 and 424, firing the agent, comparing an output data result from each of the redundant processors, propagating a data validation result, and so on. The plurality of elements 420 can implement an allocation manager, a control manager, and the like. In embodiments, the plurality of elements 420 can operate the processors 422 and 424 as dual-cores. The elements 420 can provide direct memory access (DMA) access and control, a memory protection unit to prevent memory access collisions, and so on. Other allocation techniques can be used. An allocation configuration includes three processors, where the three processors can implement triple-redundancy. Triple-redundancy can be useful for comparing an output data result from the three redundant processors. The triple-redundancy allocations can include a plurality of elements 430 and further pluralities of elements configured to implement three redundant processors 432, 434, and 436. The plurality of elements 430 can be used for loading an agent onto the redundant processors, firing the agent, comparing an output data result from each of the redundant processors, propagating a data validation result, and so on. The comparing the output data result from the three redundant processors can be accomplished using voting such as a simple majority, a weighted vote, etc. In the case of the dual redundancy, the plurality of elements 430 can implement an allocation manager, a control manager, and the like. In other embodiments, the plurality of elements 430 can operate the processors 432, 434, and 436 as multiple cores, where the multiple cores may operate in a mode other than coincident operation. The elements 430 may further provide direct memory access (DMA) access and control, a memory protection unit, and so on.

Figure 5:
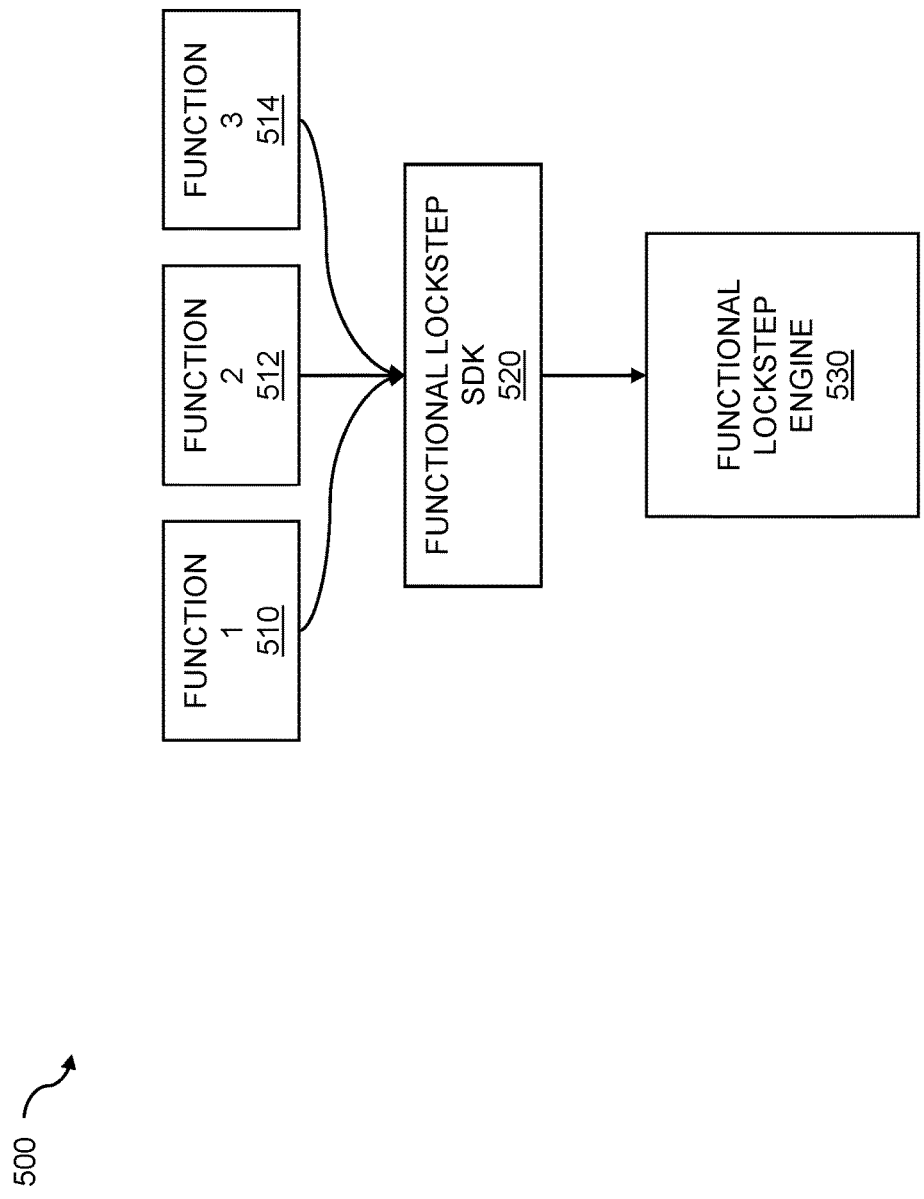
FIG. 5 is a block diagram for functional lockstep compilation.

FIG. 5 is a block diagram for functional lockstep compilation. Processor instructions or code can be compiled using techniques that support data validation using processor array redundancy. Functional lockstep compilation can enable the instructions or code to be compiled and executed on two or more processors, where the execution is based on coincident operation. In embodiments, a plurality of processing elements within a reconfigurable fabric is configured to implement two or more redundant processors, where the two or more redundant processors are enabled for coincident operation. An agent is loaded on each of the two or more redundant processors, where the agent performs a function requiring data validation. The agent is fired on each of the two or more redundant processors to commence coincident operation. An output data result from each of the two or more redundant processors is compared to enable a data validation result. The data validation result is propagated. In embodiments, the propagated data validation result can be used to validate operation of systems such as electronic systems in vehicles.

The block diagram 500 includes one or more functions. The functions can include function 1 510, function 2 512, and function 3 514. While three functions are shown, other numbers of functions can be included. The functions can be identical functions, similar functions, a mix of function types, etc. The functions can be related to autonomous or semiautonomous operation of a vehicle, safety parameters, and so on. The functions can be written in a variety of programming or coding languages such as C™, MISRA C™, C++ ™ Python™, assembly language, etc. The functions can be compiled based on a functional lockstep software development kit (SDK) 520. The functional lockstep SDK can perform various functions or operations of compilation such as lexical analysis, syntax analysis, semantic analysis, intermediate code generation, code optimization, code generation, linking, and so on. The functional lockstep SDK can link code modules, libraries, etc., to form load modules. The load modules can be loaded on and fired on two or more redundant processors. In embodiments, the load modules include or represent agents.

The block diagram 500 includes a functional lockstep engine 530. The functional lockstep engine can include two or more redundant processors, where the redundant modules can be configured from a plurality of processing elements within a reconfigurable fabric. The redundant processors can be loaded with an agent, where the agent can perform a function requiring data validation. The agent loaded on each of the redundant processors can be fired to commence coincident operation. Coincident operation can include parallel operation, simultaneous operation, lockstep operation, and so on. An output data result from each of the redundant processors can be compared to enable a data validation result. The data validation result can include a consistent or repeated data result from the redundant processors. If an odd number of processors is used, then data validation can be based on a vote, such as a majority vote, of the processors computing the output data result. The data validation result can be propagated. In embodiments, the propagating the data validation result can be based on comparing valid output data. Valid output data can be indicated by a bit, a value, a code, etc. In other embodiments, the data validation result is based on comparing invalid output data. The propagating can be based on changes to the data validation result. Further embodiments include propagating a changed data validation result when invalid output data changes to valid output data. Other detected changes may be used for propagating a changed data validation result. Other embodiments include propagating a changed data validation result when valid output data changes to invalid output data.

Figure 6:
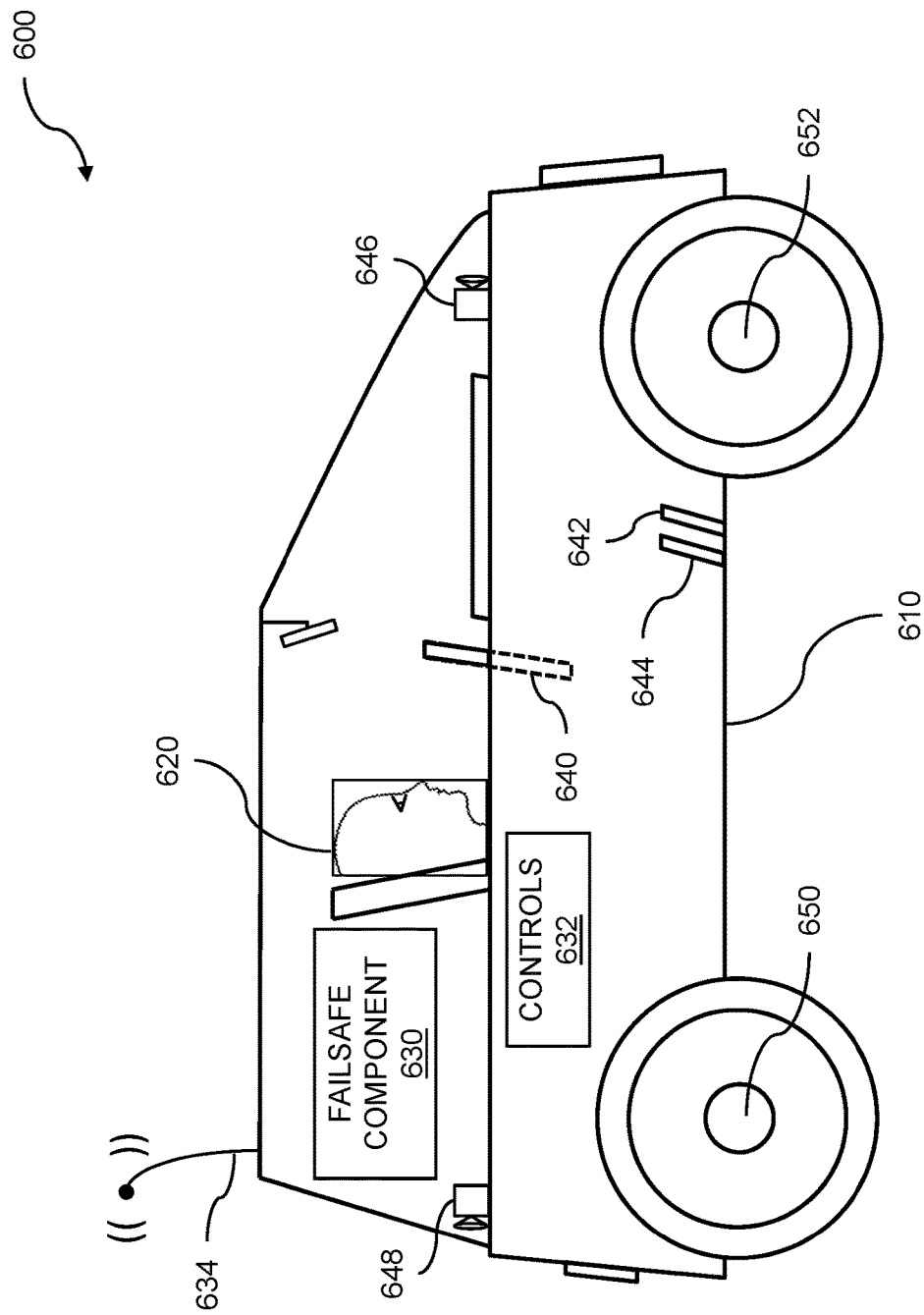
FIG. 6 illustrates a failsafe-enabled vehicle.

FIG. 6 illustrates a failsafe-enabled vehicle 600. A failsafe-enabled vehicle can use data validation techniques to enhance vehicle operation, including safety, reliability, and so on. Data validation can be based on processor array redundancy. A plurality of processing elements within a reconfigurable fabric is configured to implement two or more redundant processors, wherein the two or more redundant processors are enabled for coincident operation. An agent is loaded on each of the two or more redundant processors, wherein the agent performs a function requiring data validation. The agent on each of the two or more redundant processors is fired to commence coincident operation. An output data result from each of the two or more redundant processors is compared to enable a data validation result. The data validation result is propagated.

One or more occupants of a failsafe-enabled vehicle 610, such as occupant 620, can operate the failsafe-enabled vehicle manually, or can allow the vehicle to operate autonomously or semi-autonomously. The occupant of the failsafe-enabled vehicle can be an operator of the vehicle, a driver of the vehicle, a passenger within the vehicle, etc. While a compact automobile 610 is shown, the vehicle could be a sedan or station wagon, a sport utility vehicle (SUV), a pickup truck, a van, a bus, a truck, an application-specific vehicle, and so on. The vehicle can be operated using standard, autonomous, or semi-autonomous controls 632. The controls can include common vehicle controls such as a steering wheel 640, a throttle control 642, a brake 644, a clutch and gear change lever (not shown), and the like. The vehicle can also include one or more cameras such as a forward-facing camera 646, a rear-facing camera 648, and other cameras such as side-facing cameras (not shown). The cameras can include visible light cameras or infrared (IR) cameras. The cameras can include sensors based on other electromagnetic wavelengths such as sonar, radar, or ultrasonic spectra. These "ranging cameras" or sensors can be used for determining distance to and separation from other vehicles. The vehicle can include other sensors such as wheel sensors 650 and 652. The wheel sensors can be used for controlling four wheel or all-wheel drive, antilock braking, traction control, vehicle stability, etc.

The various controls 632 of the vehicle, as discussed, can include steering 640, acceleration 642, braking 644, clutching, shifting, stability and traction control, all-wheel drive operation, etc. The controls can be coupled to a failsafe component 630. The failsafe component can monitor or control the vehicle 610 based on data validation using processor array redundancy. The data validation can include validating data associated with vehicle controls such as steering, throttle, or brake position; image or ranging data collected by cameras or sensors; and the like. Processing of data collected from the various sensors can be processed using configured processing elements within a reconfigurable fabric. The processing elements can be configured in a master-slave configuration. In embodiments, the master-slave processing system can enable data validation when both of exactly two processors output the same output data result. Depending on which validation technique or techniques are executed on the processors, data validation can be determined based on other amounts of valid data. In other embodiments, the master-slave processing system can enable data validation when either of the exactly two processors outputs a valid result. When an odd number of processing elements is used, data validation can be based on voting such as majority voting. For example, when three processors are configured within the reconfigurable fabric, the data validation can be based on a majority vote.

The failsafe component can communicate with a hub, such as a vehicle control hub, with centralized traffic control, with other vehicles, and so on, using wireless communications techniques. The wireless communication can be facilitated by an antenna 634 or other communication enhancement techniques. Communications with the failsafe component via the antenna can include instructions for autonomous or semi-autonomous vehicle operation, telemetry data collected by cameras or sensors, location data such as global positioning system (GPS) coordinates, and the like.

Figure 7:
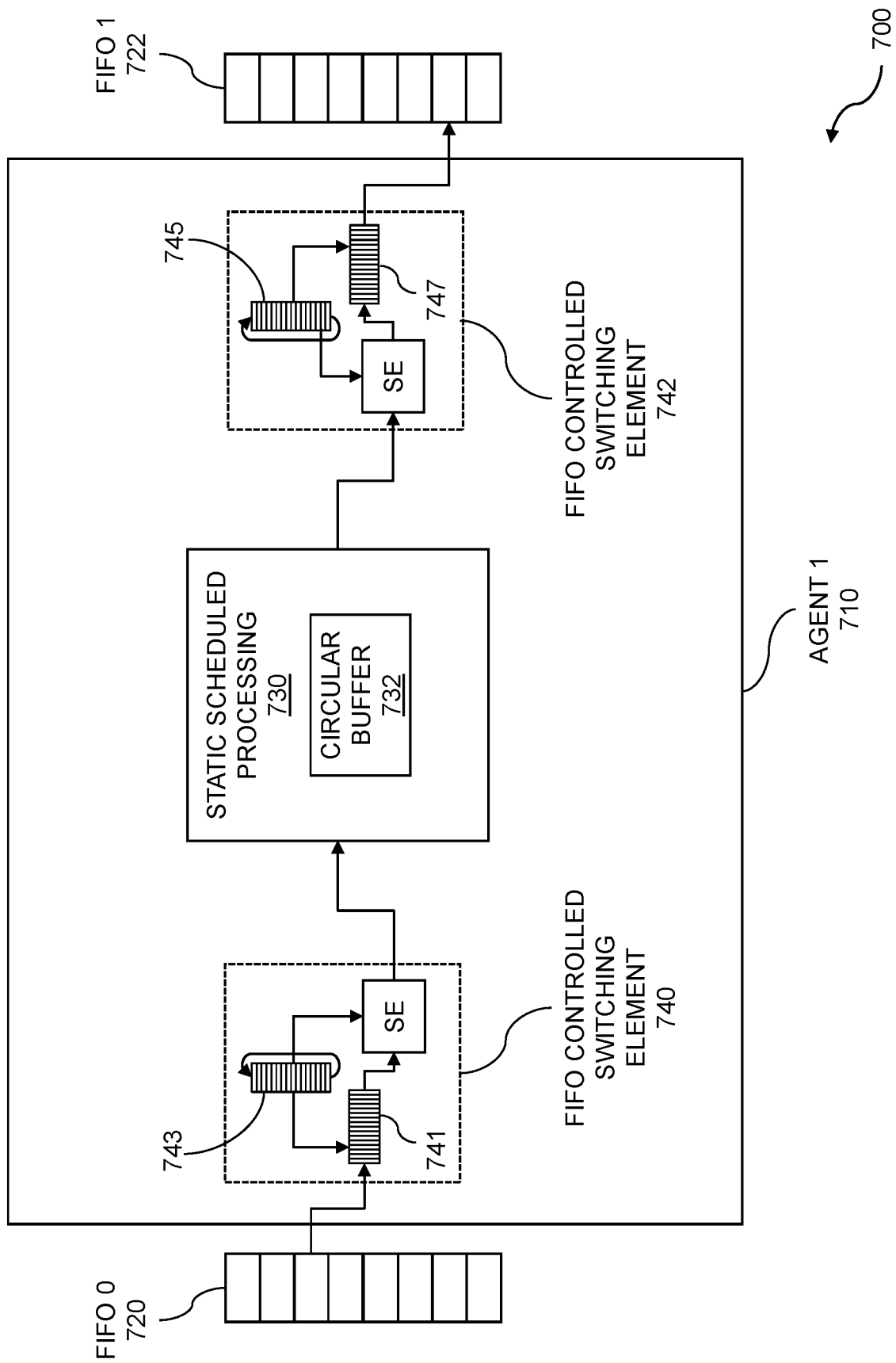
FIG. 7 shows scheduled sections relating to an agent.

FIG. 7 shows scheduled sections relating to an agent 700. An agent can be one of a plurality of agents which process array redundancy for data validation. A plurality of processing elements is configured within a reconfigurable fabric to implement two or more redundant processors, where the two or more redundant processors are enabled for coincident operation. An agent is loaded on each of the two or more redundant processors, wherein the agent performs a function requiring data validation. The agent is fired on each of the two or more redundant processors to commence coincident operation. An output data result is compared from each of the two or more redundant processors to enable a data validation result. The data validation result is propagated, where the propagating can be based on comparing valid or invalid output data, a changed data validation result when invalid output data changes to valid output data or valid output data changes to invalid output data, and so on. The propagating can be accomplished using an interrupt signal.

The figure shows an example 700 of scheduled sections relating to an agent. A FIFO 720 serves as an input FIFO for a control agent 1 710. Data from FIFO 0 720 is read into the local buffer 741 of a FIFO controlled switching element 740. A circular buffer 743 may contain instructions that are executed by a switching element (SE), and may modify data based on one or more logical operations, including, but not limited to, XOR, OR, AND, NAND, and/or NOR. The plurality of processing elements can be controlled by circular buffers. The modified data may be passed to a circular buffer 732 under static scheduled processing 730. Thus, the scheduling of circular buffer 732 may be performed at compile time. The instructions loaded into circular buffer 732 may occur as part of a program initialization, and may remain in the circular buffer 732 throughout the execution of the program (control agent). The circular buffer 732 may provide data to another FIFO controlled switching element 742. A second circular buffer 745 may rotate to provide a plurality of instructions/operations to modify and/or transfer data to a second data buffer 747, which is then transferred to an external FIFO 1 722.

A process agent can include multiple components. An input component handles retrieval of data from an input FIFO. For example, the agent 710 receives input from FIFO 0 720. An output component handles the sending of data to an output FIFO, such as agent 710 providing data to FIFO 1 722. A signaling component can send a signal to process agents executing on neighboring processing elements about conditions of a FIFO. For example, a process agent can issue a FIRE signal to another process agent operating on another processing element when new data is available in a FIFO that was previously empty. Similarly, a process agent can issue a DONE signal to another process agent operating on another processing element when new space is available in a FIFO that was previously full. In this way, the process agent facilitates communication of data and FIFO states among neighboring processing elements to enable complex computations with multiple processing elements in an interconnected topology.

Figure 8:
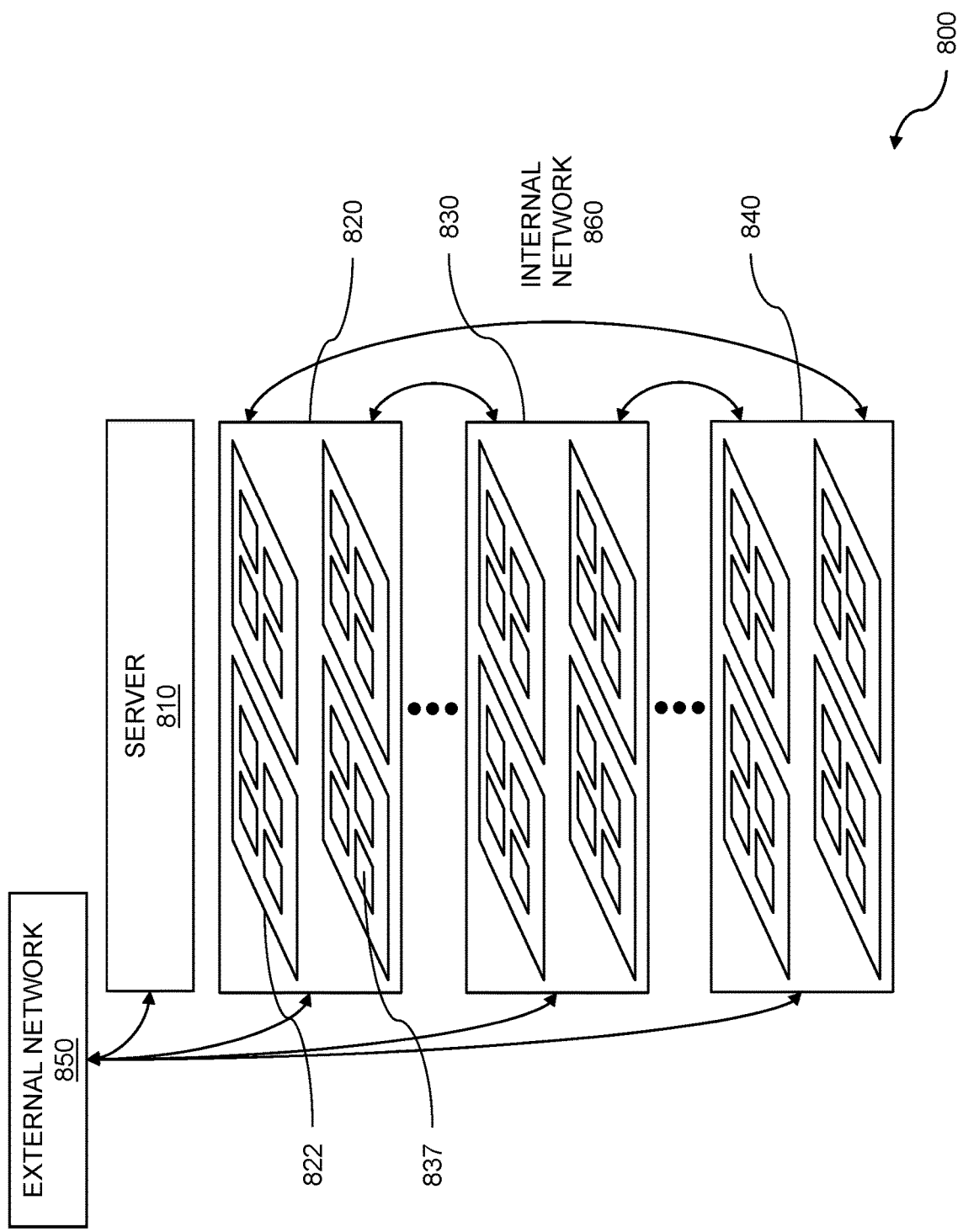
FIG. 8 illustrates a server allocating FIFOs and processing elements.

FIG. 8 illustrates a server allocating FIFOs and processing elements. First in first out (FIFO) techniques can be used to support processor array redundancy for data validation. The FIFOs can be scheduled, coded, or programmed to configure the processing elements, where the processing elements can be located within a reconfigurable fabric. A plurality of processing elements within a reconfigurable fabric can be configured to implement two or more redundant processors. The two or more redundant processors can be enabled for coincident operation. An agent can be loaded on each of the two or more redundant processors. The agent can perform a function requiring data validation. The agent can be fired on each of the two or more redundant processors to commence coincident operation. The data validation result can be propagated.

In embodiments, system 800 includes one or more boxes, indicated by callouts 820, 830, and 840. Each box may have one or more boards, indicated generally as 822. Each board comprises one or more chips, indicated generally as 837. Each chip may include one or more processing elements, where at least some of the processing elements may execute a process agent. An internal network 860 allows for communication between the boxes such that processing elements on one box can provide and/or receive results from processing elements on another box. The server 810 may be a computer executing programs on one or more processors based on instructions contained in a non-transitory computer readable medium. The server 810 may perform reconfiguring of a mesh-networked computer system comprising a plurality of processing elements with a FIFO between one or more pairs of processing elements. In some embodiments, each pair of processing elements has a dedicated FIFO configured to pass data between the processing elements of the pair. The server 810 may receive instructions and/or input data from an external network 850. The external network may provide information that includes, but is not limited to, hardware description language instructions (e.g. Verilog, VHDL, or the like), flow graphs, source code, or information in another suitable format.

The server 810 may collect performance statistics on the operation of the collection of processing elements. The performance statistics can include number of fork operations, number of join operations, average sleep time of a processing element, and/or a histogram of the sleep time of each processing element. Any outlier processing elements that sleep for a longer time than a predetermined threshold allows can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 810 may serve as an allocation manager to process requests for adding or freeing FIFOs, and/or changing the size of existing FIFOs in order to optimize operation of the processing elements.

In some embodiments, the server may receive optimization settings from the external network 850. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 810 can perform a reconfiguration based on user-specified parameters via external network 850.

Figure 9:
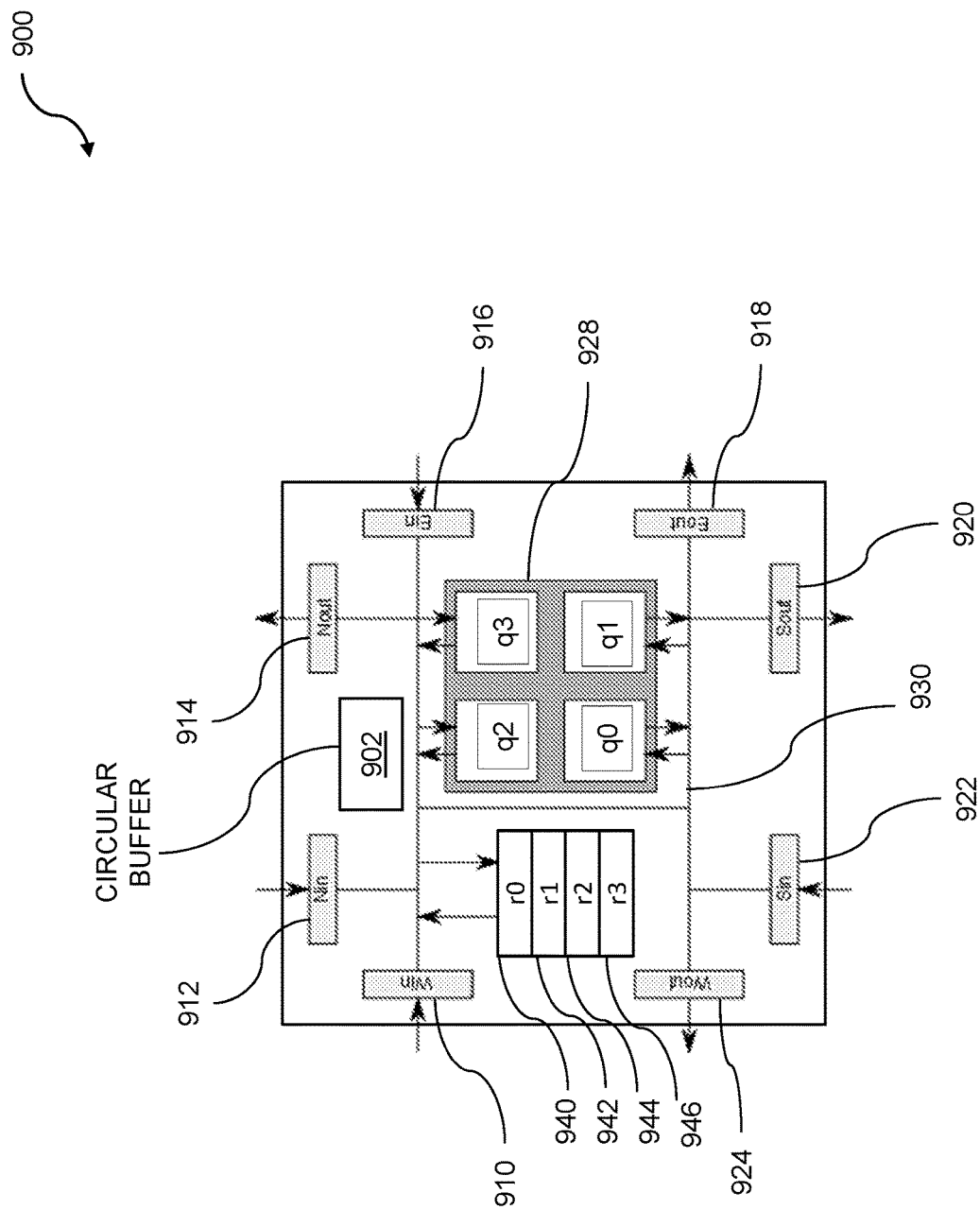
FIG. 9 shows a cluster for coarse-grained reconfigurable processing.

FIG. 9 shows a cluster for coarse-grained reconfigurable processing. The cluster for coarse-grained reconfigurable processing 900 can be used for data validation using processor array redundancy. The data validation can include configuring processing elements within a reconfigurable fabric to implement processor array redundancy. The processing elements such as clusters or quads of processing elements on the reconfigurable fabric can include processing elements, switching elements, storage elements, etc. A plurality of processing elements within a reconfigurable fabric can be configured to implement two or more redundant processors, wherein the two or more redundant processors are enabled for coincident operation. An agent can be loaded on each of the two or more redundant processors, where the agent performs a function requiring data validation. The agent can be fired on each of the two or more redundant processors to commence coincident operation. An output data result from each of the two or more redundant processors can be compared to enable a data validation result. The data validation result can be propagated.

The cluster 900 comprises a circular buffer 902. The circular buffer 902 can be referred to as a main circular buffer or a switch-instruction circular buffer. In some embodiments, the cluster 900 comprises additional circular buffers corresponding to processing elements within the cluster. The additional circular buffers can be referred to as processor instruction circular buffers. The example cluster 900 comprises a plurality of logical elements, configurable connections between the logical elements, and a circular buffer 902 controlling the configurable connections. The logical elements can further comprise one or more of switching elements, processing elements, or storage elements. The example cluster 900 also comprises four processing elements—q0, q1, q2, and q3. The four processing elements can be collectively referred to as a "quad," and can be jointly indicated by a grey reference box 928. In embodiments, there is intercommunication among and between each of the four processing elements. In embodiments, the circular buffer 902 controls the passing of data to the quad of processing elements 928 through switching elements. In embodiments, the four processing elements 928 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 900 can further comprise storage elements coupled to the configurable connections. As shown, the cluster 900 comprises four storage elements—r0 940, r1 942, r2 944, and r3 946. The cluster 900 further comprises a north input (Nin) 912, a north output (Nout) 914, an east input (Ein) 916, an east output (Eout) 918, a south input (Sin) 922, a south output (Sout) 920, a west input (Win) 910, and a west output (Wout) 924. The circular buffer 902 can contain switch instructions that implement configurable connections. For example, an instruction effectively connects the west input 910 with the north output 914 and the east output 918 and this routing is accomplished via bus 930. The cluster 900 can further comprise a plurality of circular buffers residing on a semiconductor chip where the plurality of circular buffers controls unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 902. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 924 to an instruction placing data on the south output 920, such that the data can be output on both output ports within the same pipeline cycle. In a case where data needs to travel to a cluster that is both south and west of the cluster 900, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A" to initiate a transfer of data between cluster "B" and cluster "C" without any involvement of the processing elements in clusters "B"

and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAM in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/ output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed to enter configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals, but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to be fully vacant because a fire signal might be sent to the agent by the upstream agent. When the upstream agent is partially resident or is fully vacant, then the agent can be fully vacated from the reconfigurable fabric. The agent can be fully vacated if it asserts both the input buffers empty and output buffers empty signals.

Figure 10:
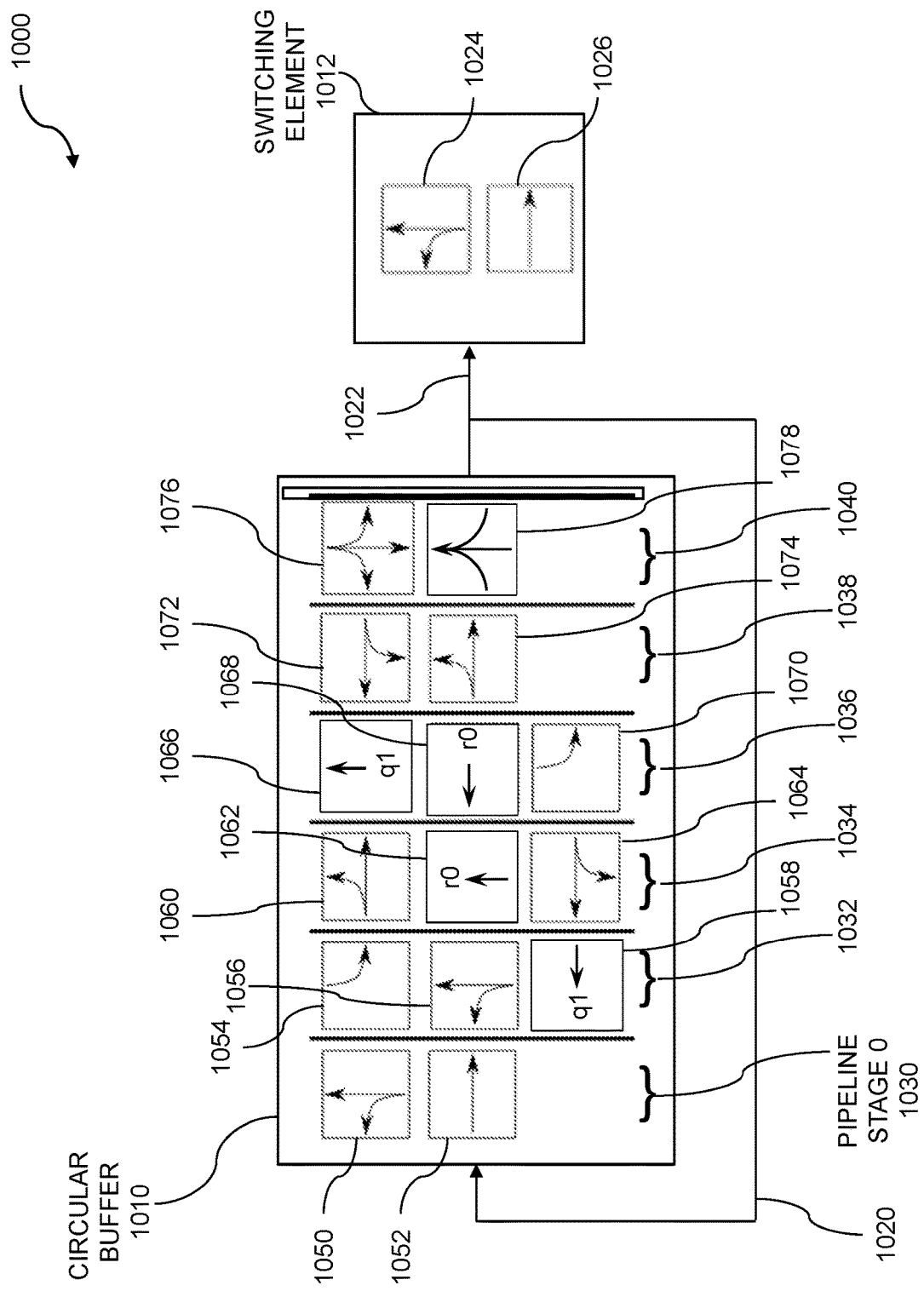
FIG. 10 illustrates a block diagram of a circular buffer.

FIG. 10 illustrates a block diagram of a circular buffer. The circular buffer 1000 can include a switching element 1012 corresponding to the circular buffer. The circular buffer and the corresponding switching element can be used in part for data validation using processor array redundancy. Using the circular buffer 1010 and the corresponding switching element 1012, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 1000 describes a processor-implemented method for data manipulation. The circular buffer 1010 contains a plurality of pipeline stages. Each pipeline stage contains one or more instructions, up to a maximum instruction depth. In the embodiment shown in FIG. 10, the circular buffer 1010 is a 6×3 circular buffer, meaning that it implements a six-stage pipeline with an instruction depth of up to three instructions per stage (column). Hence, the circular buffer 1010 can include one, two, or three switch instruction entries per column. In some embodiments, the plurality of switch instructions per cycle can comprise two or three switch instructions per cycle. However, in certain embodiments, the circular buffer 1010 supports only a single switch instruction in a given cycle. In the example 1000 shown, Pipeline Stage 0 1030 has an instruction depth of two instructions 1050 and 1052. Though the remaining pipeline stages 1-5 are not textually labeled in the FIG. 1000, the stages are indicated by callouts 1032, 1034, 1036, 1038, and 1040. Pipeline stage 1 1032 has an instruction depth of three instructions 1054, 1056, and 1058. Pipeline stage 2 1034 has an instruction depth of three instructions 1060, 1062, and 1064. Pipeline stage 3 1036 also has an instruction depth of three instructions 1066, 1068, and 1070. Pipeline stage 4 1038 has an instruction depth of two instructions 1072 and 1074. Pipeline stage 5 1040 has an instruction depth of two instructions 1076 and 1078. In embodiments, the circular buffer 1010 includes 64 columns. During operation, the circular buffer 1010 rotates through configuration instructions. The circular buffer 1010 can dynamically change operation of the logical elements based on the rotation of the circular buffer. The circular buffer 1010 can comprise a plurality of switch instructions per cycle for the configurable connections.

The instruction 1052 is an example of a switch instruction. In embodiments, each cluster has four inputs and four outputs, each designated within the cluster's nomenclature as "north," "east," "south," and "west" respectively. For example, the instruction 1052 in the diagram 1000 is a west-to-east transfer instruction. The instruction 1052 directs the cluster to take data on its west input and send out the data on its east output. In another example of data routing, the instruction 1050 is a fan-out instruction. The instruction 1050 instructs the cluster to take data from its south input and send out on the data through both its north output and its west output. The arrows within each instruction box indicate the source and destination of the data. The instruction 1078 is an example of a fan-in instruction. The instruction 1078 takes data from the west, south, and east inputs and sends out the data on the north output. Therefore, the configurable connections can be considered to be time multiplexed.

In embodiments, the clusters implement multiple storage elements in the form of registers. In the example 1000 shown, the instruction 1062 is a local storage instruction. The instruction 1062 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of a sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAMs) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 1058 is a processing instruction. The instruction 1058 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 1000 shown, the circular buffer 1010 rotates instructions in each pipeline stage into the switching element 1012 via a forward data path 1022, and also back to a pipeline stage 0 1030 via a feedback data path 1020.

Instructions can include switch instructions, storage instructions, and processing instructions, among others. The feedback data path 1020 can allow instructions within the switching element 1012 to be transferred back to the circular buffer. Hence, the instructions 1024 and 1026 in the switching element 1012 can also be transferred back to pipeline stage 0 as the instructions 1050 and 1052. In addition to the instructions depicted on FIG. 10, a no-op instruction can also be inserted into a pipeline stage. In embodiments, a no-op instruction causes execution to not be performed for a given cycle. In effect, the introduction of a no-op instruction can cause a column within the circular buffer 1010 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 1058, assuming that the processor q1 was previously in a sleep state. In embodiments, when the instruction 1058 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 1066. In the case of the instruction 1066, data from the processor q1 is moved to the north output. In some embodiments, if Xs have been placed into the processor q1, such as during the instruction 1058, then Xs would be retrieved from the processor q1 during the execution of the instruction 1066 and would be applied to the north output of the instruction 1066.

A collision occurs if multiple instructions route data to a particular port in a given pipeline stage. For example, if instructions 1052 and 1054 are in the same pipeline stage, they will both send data to the east output at the same time, thus causing a collision since neither instruction is part of a time-multiplexed fan-in instruction (such as the instruction 1078). To avoid potential collisions, certain embodiments use preprocessing, such as by a compiler, to arrange the instructions in such a way that there are no collisions when the instructions are loaded into the circular buffer. Thus, the circular buffer 1010 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 1062), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that calculates the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the memory bit is reset to 0 which thereby prevents a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs which are obtained using a query mechanism. Read requests to slave interfaces use one of the flow control mechanisms described previously.

Figure 11:
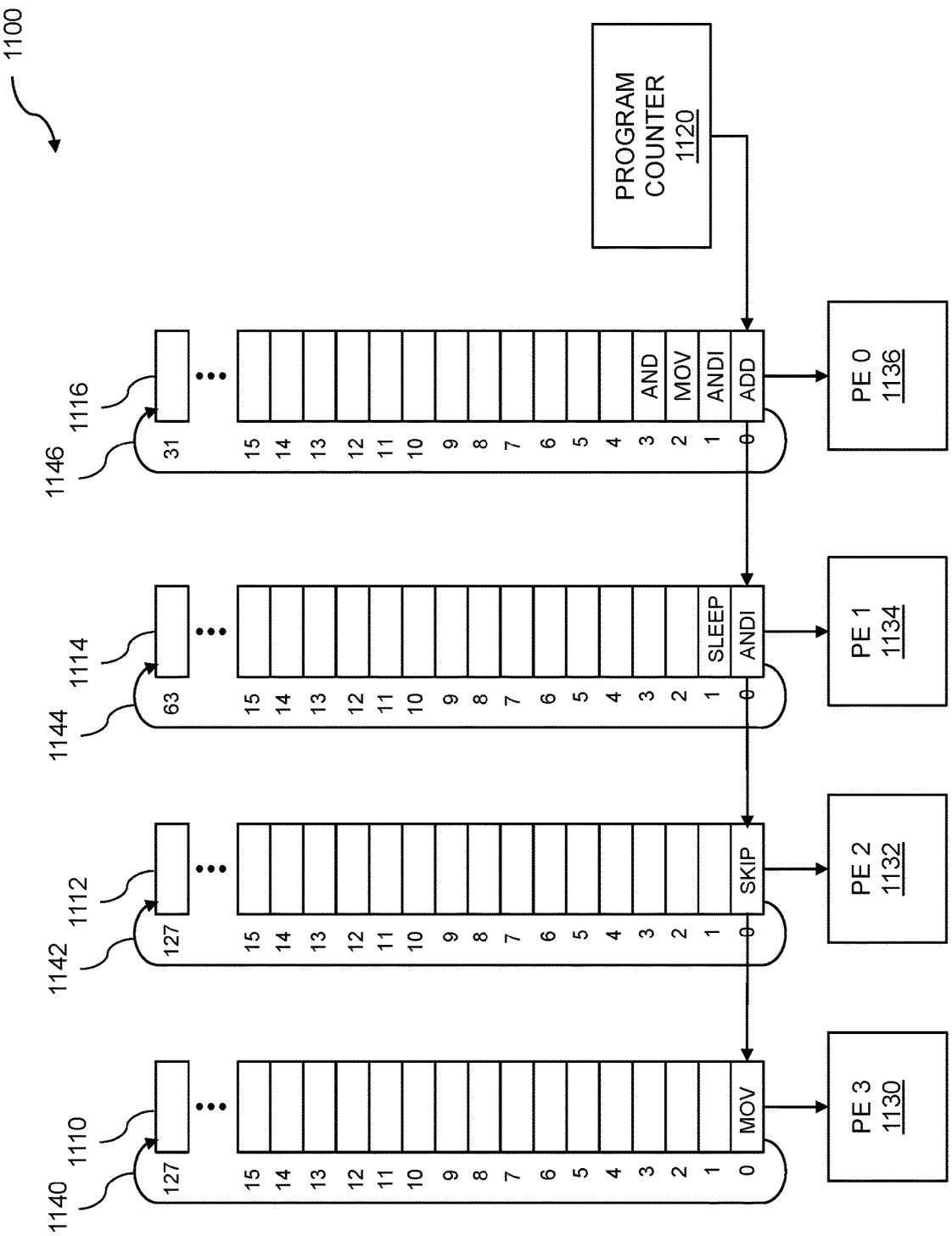
FIG. 11 shows circular buffers and processing elements.

FIG. 11 shows circular buffers and processing elements. A diagram 1100 indicates example instruction execution for processing elements. The processing elements can include a portion of or all of the elements within a reconfigurable fabric. Elements within the reconfigurable figure can include processing elements, storage elements, switching elements, and the like. The instruction execution can include instructions for processor array redundancy for data validation. A circular buffer 1110 feeds a processing element 1130. A second circular buffer 1112 feeds another processing element 1132. A third circular buffer 1114 feeds another processing element 1134. A fourth circular buffer 1116 feeds another processing element 1136. The four processing elements 1130, 1132, 1134, and 1136 can represent a quad of processing elements. In embodiments, the processing elements 1130, 1132, 1134, and 1136 are controlled by instructions received from the circular buffers 1110, 1112, 1114, and 1116 respectively. The circular buffers can be implemented using feedback paths 1140, 1142, 1144, and 1146, respectively. In embodiments, the circular buffer can control the passing of data to a quad of processing elements through switching elements, where each of the quad of processing elements is controlled by four other circular buffers (as shown in the circular buffers 1110, 1112, 1114, and 1116). Data is passed back through the switching elements from the quad of processing elements where the switching elements are again controlled by the main circular buffer. In embodiments, a program counter 1120 is configured to point to the current instruction within a circular buffer. In embodiments with a configured program counter, the contents of the circular buffer are not shifted or copied to new locations on each instruction cycle. Rather, the program counter 1120 is incremented in each cycle to point to a new location in the circular buffer. The circular buffers 1110, 1112, 1114, and 1116 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

The plurality of circular buffers can have differing lengths. That is, the plurality of circular buffers can comprise circular buffers of differing sizes. In embodiments, the first two circular buffers 1110 and 1112 have a length of 128 instructions, the third circular buffer 1114 has a length of 64 instructions, and the fourth circular buffer 1116 has a length of 32 instructions, but other circular buffer lengths are also possible, and in some embodiments, all buffers have the same length. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 11, different circular buffers can have different instruction sets within them. For example, the first circular buffer 1110 contains a MOV instruction. The second circular buffer 1112 contains a SKIP instruction. The third circular buffer 1114 contains a SLEEP instruction and an ANDI instruction. The fourth circular buffer 1116 contains an AND instruction, a MOVE instruction, an ANDI instruction, and an ADD instruction. The operations performed by the processing elements 1130, 1132, 1134, and 1136 are dynamic and can change over time, based on the instructions loaded into the respective circular buffers. As the circular buffers rotate, new instructions can be executed by the respective processing element.

Figure 12:
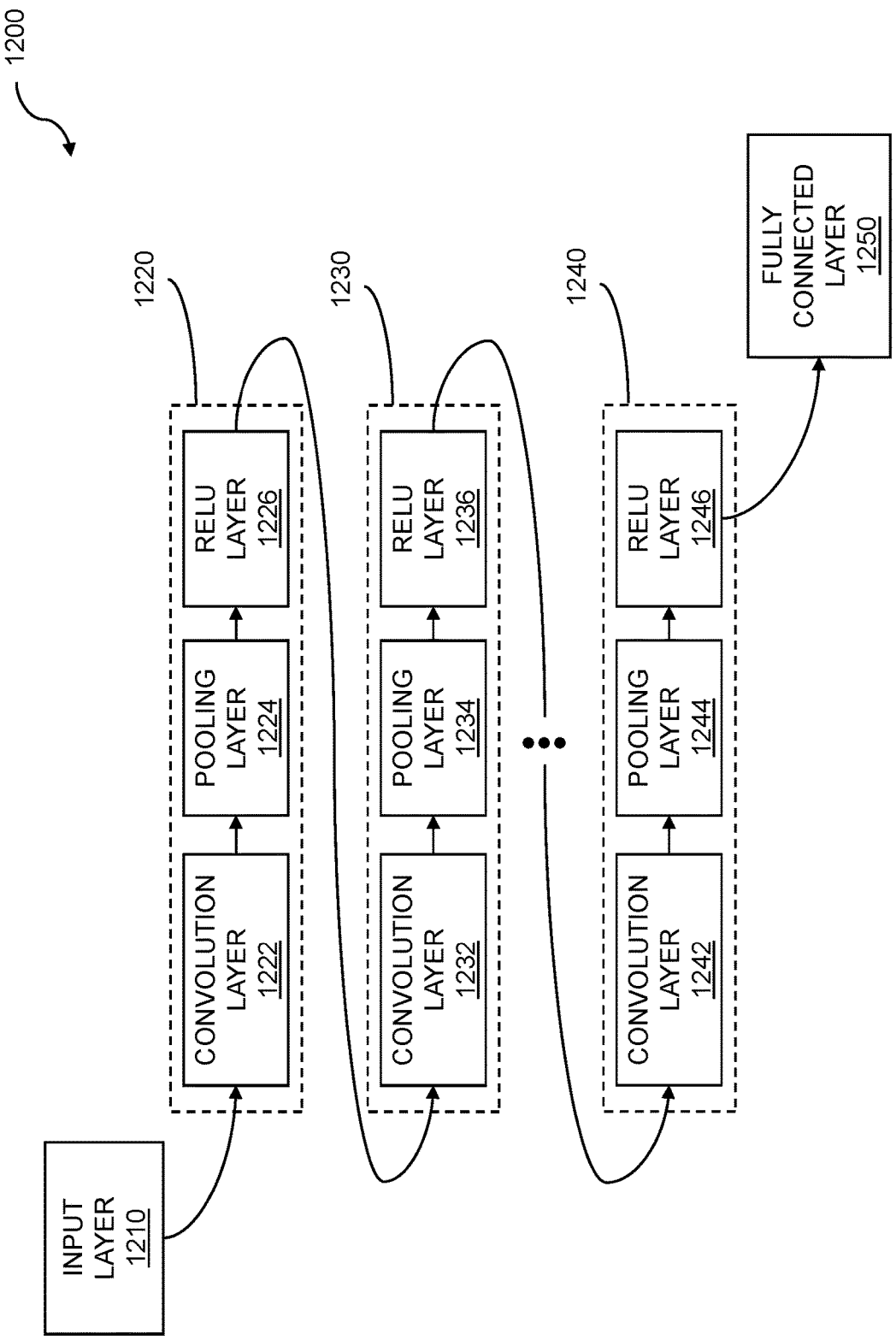
FIG. 12 shows a deep learning block diagram.

FIG. 12 shows a deep learning block diagram. The deep learning block diagram 1200 can include a neural network such as a deep neural network (DNN), a convolutional neural network (CNN), a recurrent neural network (RNN), and so on. A convolutional neural network can be based on layers, where the layers can include input layers, output layers, fully connected layers, convolution layers, pooling layers, rectified linear unit (ReLU) layers, bottleneck layers, and so on. The layers of the convolutional network can be implemented using a reconfigurable fabric. The reconfigurable fabric can include processing elements, switching elements, storage elements, etc. The reconfigurable fabric can be used to perform various operations such as logical or other operations. Deep learning can be applied to data validation using processor array redundancy. The layers of the neural network such as the convolutional neural network can be implemented within one or more integrated circuits or chips, where the chips can include a reconfigurable fabric. A given chip from among the one or more chips can implement one or more layers. When a neural network such as a convolutional neural network cannot be loaded into a reconfigurable fabric, the neural network may be partitioned, where a partition may "fit" into the reconfigurable fabric.

A deep learning block diagram 1200 is shown. The block diagram can include various layers, where the layers can include an input layer, hidden layers, a fully connected layer, and so on. In some embodiments, the deep learning block diagram can include a classification layer. The input layer 1210 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 1200, which can represent a network such as a convolutional neural network, can contain a plurality of hidden layers. While three hidden layers, a first hidden layer 1220, a second hidden layer 1230, and a third hidden layer 1240 are shown, other numbers of hidden layers may be present. Each hidden layer can include layers that perform various operations, where the various layers can include a convolution layer, a pooling layer, and a rectified layer such as a rectified linear unit (ReLU) layer. Thus, a first layer 1220 can include a convolution layer 1222, a pooling layer 1224, and a ReLU layer 1226; a second layer 1230 can include a convolution layer 1232, a pooling layer 1234, and a ReLU layer 1236; and a third layer 1240 can include a convolution layer 1242, a pooling layer 1244, and a ReLU layer 1246. The convolution layers 1222, 1232, and 1242 can perform convolution operations; the pooling layers 1224, 1234, and 1244 can perform pooling operations, including max pooling, such as data down-sampling; and the ReLU layers 1226, 1236, and 1246 can perform rectification operations. A convolutional layer can reduce the amount of data feeding into a fully connected layer. The block diagram 1200 can include a fully connected layer 1250. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads and can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence the operation of an entire system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 13:
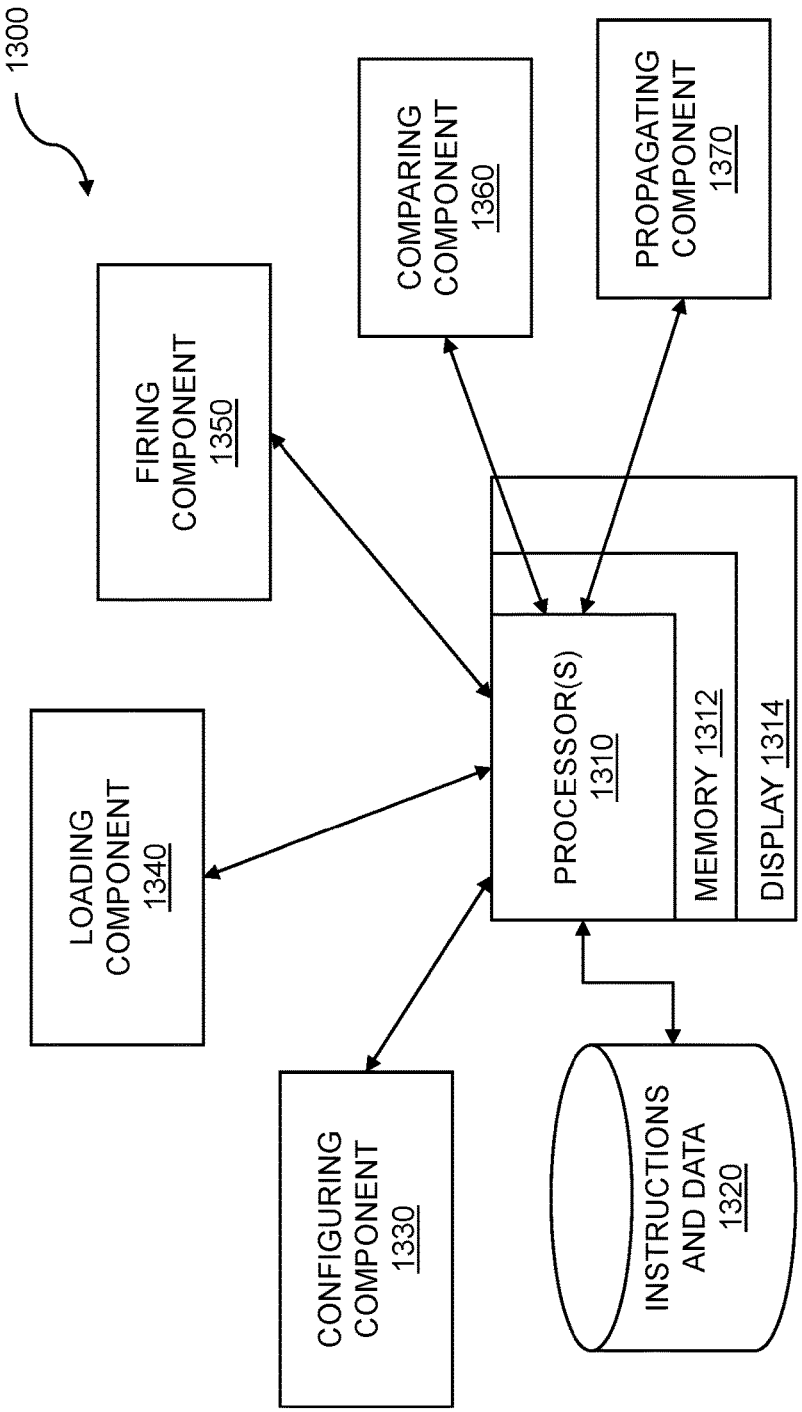
FIG. 13 is a system diagram for data processor array redundancy.

FIG. 13 is a system diagram for data processor array redundancy.

The system 1300 can include one or more processors 1310 coupled to a memory 1312 which stores instructions. The system 1300 can include a display 1314 coupled to the one or more processors 1310 for displaying data, intermediate steps, instructions, and so on. In embodiments, one or more processors 1310 are attached to the memory 1312 where the one or more processors, when executing the instructions which are stored, are configured to: configure a plurality of processing elements within a reconfigurable fabric to implement two or more redundant processors, wherein the two or more redundant processors are enabled for coincident operation; load an agent on each of the two or more redundant processors, wherein the agent performs a function requiring data validation; fire the agent on each of the two or more redundant processors to commence coincident operation; compare an output data result from each of the two or more redundant processors to enable a data validation result; and propagate the data validation result.

The system 1300 can include a collection of instructions and data 1320. The instructions and data 1320 may be stored in a database, one or more statically linked libraries, one or more dynamically linked libraries, precompiled headers, source code, flow graphs, or other suitable formats. The instructions can include instructions for data validation for processor array redundancy, where the processors can include processing elements in a reconfigurable fabric. The system 1300 can include a configuring component 1330. The configuring component can include functions and instructions for configuring a plurality of processing elements within a reconfigurable fabric to implement two or more redundant processors, where the two or more redundant processors are enabled for coincident operation. The coincident operation can include a lockstep operation. The system 1300 can include a loading component 1340. The loading component 1340 can include functions and instructions for loading an agent on each of the two or more redundant processors, where the agent can perform a function requiring data validation. The process agents can represent nodes of a graph such as a data flow graph. The process agents can receive one or more data inputs, can process the data, or can generate output data. In embodiments, the two or more clusters can be initialized to perform an operation based on one or more agents developed in a software development kit (SDK). Data validation can be required for scenarios including safe operation of autonomous vehicles such as self-driving cars. Data validation can include validating sensor or other data for accelerating the self-driving car, braking, steering, swerving for collision avoidance, etc.

The system 1300 can include a firing component 1350. The firing component 1350 can include functions and instructions for firing the agent on each of the two or more redundant processors to commence coincident operation. An agent can be initiated or fired by receiving a fire signal. The fire signal can be initiated by or received from another agent, from an execution manager, from a rotating buffer within the reconfigurable fabric, and so on. The executing the valid data can include determining that valid data is present and available to the agent. Valid data can be differentiated from invalid data based on a value, a key, a code, a flag, or the like. The executing valid data can include execution by a first agent on a first redundant processor from the plurality of processing elements, by a second agent on a second redundant processor from the plurality of processing elements, and so on. In embodiments, the first process agent corresponds to a starting node of the data flow graph.

The system 1300 can include a comparing component 1360. The comparing component can include functions and instructions for comparing an output data result from each of the two or more redundant processors to enable a data validation result. The comparing can include determining that the data results of the two or more redundant processors are either equivalent or different. In embodiments, the data validation result can be based on comparing valid output data. As discussed throughout, the output data can be valid based on a value, a key, a code, a flag, or the like. In other embodiments, the data validation result can be based on comparing invalid output data. The comparing can be based on a vote, a majority, a weighted vote or priority, and the like. In embodiments, the output data resulting from an odd number of redundant processors can be compared to enable a majority vote.

The system 1300 can include a propagating component 1370. The propagating component 1370 can include functions and instructions for propagating the data validation result. The data that can be propagated can include valid data, invalid data, and so on. In embodiments, the propagating the data validation result can be based on comparing valid output data. The valid output data can be propagated to other agents or processors, to an output node, etc. In other embodiments, the propagating the data validation result is based on comparing invalid output data. Invalid output data may be propagated to stop the operation of one or more agents. The propagating can also be based on changes. Further embodiments include propagating a changed data validation result when invalid output data changes to valid output data. The changed data validation result can include a fire signal. The changed data validation result can initiate processing of a downstream agent. Other further embodiments include propagating a changed data validation result when valid output data changes to invalid output data. The propagating a changed data validation result based on invalid output data can be used to halt processing by an agent, regardless of whether the agent is an upstream agent or a downstream agent. The propagating can be accomplished using an interrupt signal. An interrupt signal can include initiating an interrupt request (IR or IRQ). The IRQ can include a flag, a semaphore, a signal, and the like. The interrupt request can be based on the detecting propagation of a data validation result, a changed data validation result, etc.

The system 1300 can include a computer program product embodied in a non-transitory computer readable medium for data validation, the computer program product comprising code which causes one or more processors to perform operations of: configuring a plurality of processing elements within a reconfigurable fabric to implement two or more redundant processors, wherein the two or more redundant processors are enabled for coincident operation; loading an agent on each of the two or more redundant processors, wherein the agent performs a function requiring data validation; firing the agent on each of the two or more redundant processors to commence coincident operation; comparing an output data result from each of the two or more redundant processors to enable a data validation result; and propagating the data validation result.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data validation comprising:
    configuring a plurality of processing elements within a reconfigurable fabric to implement at least a pair of redundant processor sets, each redundant processor set comprising two or more redundant processors, wherein each set of two or more redundant processors is enabled for coincident operation;
    loading an agent on each set of the two or more redundant processors, wherein the agent performs a function requiring data validation;
    firing the agent on each set of the two or more redundant processors to commence coincident operation on each set;
    for each set of two or more redundant processors:
        comparing an output data result from each of the two or more redundant processors to determine a data validation result, wherein the data validation result comprises valid data output by at least one of the two or more redundant processors; and
        determining a relative priority for each of the two or more redundant processors based on the data validation result;
    comparing a valid data output by one set of two or more redundant processors with a valid data output by another set of two or more redundant processors; and permitting, based on the comparison of valid data output, the function performed by the agent.

2. The method of claim 1 wherein the coincident operation comprises a lockstep operation.

3. The method of claim 2 wherein the coincident operation comprises synchronizing at least one of the sets of two or more redundant processors on a fine grain timing basis.

4. The method of claim 3 wherein the fine grain timing basis keeps the two or more redundant processors coordinated on a tic boundary.

5. The method of claim 2 wherein the coincident operation comprises synchronizing at least one of the sets of the two or more redundant processors on a coarse grain timing basis.

6. The method of claim 5 wherein the coarse grain timing basis keeps the two or more redundant processors coordinated on a cycle boundary.

7. The method of claim 1 wherein the two or more redundant processors are exactly two processors.

8. The method of claim 7 wherein the exactly two processors comprise a master-slave processor system.

9. The method of claim 8 wherein the master-slave processor system enables data validation when either of the exactly two processors outputs a valid result.

10. The method of claim 1 wherein the two or more redundant processors are exactly three processors.

11. The method of claim 10 wherein the exactly three processors comprise a triple-redundancy processor system.

12. The method of claim 11 wherein the triple-redundancy processor system enables data validation when at least one of the exactly three processors outputs a valid output data result.

13. The method of claim 1 further comprising subsequently disabling the function performed by the agent when the valid data output by at least one of the two or more redundant processors of at least one set of two or more redundant processors changes from valid data to invalid data.

14. The method of claim 1 wherein the propagating is accomplished using an interrupt signal.

15. The method of claim 14 wherein the interrupt signal is asynchronous.

16. The method of claim 1 wherein the plurality of processing elements forms two or more clusters within a reconfigurable fabric.

17. The method of claim 16 wherein a cluster within two or more clusters is synchronized to a tic cycle boundary.

18. The method of claim 17 wherein the cluster within the two or more clusters and a second cluster within the two or more clusters operate on different tic cycles.

19. The method of claim 17 wherein the cluster within the two or more clusters and a second cluster within the two or more clusters operate on different tic clocks.

20. A computer program product embodied in a non-transitory computer readable medium for data validation, the computer program product comprising code which causes one or more processors to perform operations of:

configure a plurality of processing elements within a reconfigurable fabric to implement at least a pair of redundant processor sets, each redundant processor set comprising two or more redundant processors, wherein each set of two or more redundant processors is enabled for coincident operation;

load an agent on each set of the two or more redundant processors, wherein the agent performs a function requiring data validation;

fire the agent on each set of the two or more redundant processors to commence coincident operation on each set;

for each set of two or more redundant processors:
compare an output data result from each of the two or more redundant processors to determine a data validation result, wherein the data validation result comprises valid data output by at least one of the two or more redundant processors; and
determine a relative priority for each of the two or more redundant processors based on the data validation result;

compare a valid data output by one set of two or more redundant processors with a valid data output by another set of two or more redundant processors; and permit, based on the comparison of valid data output, the function performed by the agent.

21. A computer system for data validation comprising:
a memory which stores instructions;
one or more processors attached to the memory wherein the one or more processors, when executing the instructions which are stored, are configured to:
configure a plurality of processing elements within a reconfigurable fabric to implement at least a pair of redundant processor sets, each redundant processor set comprising two or more redundant processors, wherein each set of two or more redundant processors is enabled for coincident operation;
load an agent on each set of the two or more redundant processors, wherein the agent performs a function requiring data validation;
fire the agent on each set of the two or more redundant processors to commence coincident operation on each set;
for each set of two or more redundant processors:
compare an output data result from each of the two or more redundant processors to determine a data validation result, wherein the data validation result comprises valid data output by at least one of the two or more redundant processors; and
determine a relative priority for each of the two or more redundant processors based on the data validation result;
compare a valid data output by one set of two or more redundant processors with a valid data output by another set of two or more redundant processors; and
permit, based on the comparison of valid data output, the function performed by the agent.

* * * * *